(12) United States Patent
Michaels et al.

(10) Patent No.: US 8,351,484 B2
(45) Date of Patent: Jan. 8, 2013

(54) COMMUNICATIONS SYSTEM EMPLOYING CHAOTIC SPREADING CODES WITH STATIC OFFSETS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 741 days.

(21) Appl. No.: 12/345,163

(22) Filed: Dec. 29, 2008

(65) Prior Publication Data

US 2010/0165828 A1 Jul. 1, 2010

(51) Int. Cl.
*H04B 1/00* (2006.01)

(52) U.S. Cl. ....................................................... 375/141

(58) Field of Classification Search ............. 375/E7.126, 375/240.01, 140, 141, 146; 370/342, 441, 370/392, 208
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 4,893,316 A | 1/1990 | Janc et al. |
| 5,007,087 A | 4/1991 | Bernstein et al. |
| 5,048,086 A | 9/1991 | Bianco et al. |
| 5,077,793 A | 12/1991 | Falk et al. |
| 5,210,770 A | 5/1993 | Rice |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,596,600 A | 1/1997 | Dimos et al. |
| 5,598,476 A | 1/1997 | LaBarre et al. |
| 5,646,997 A | 7/1997 | Barton |
| 5,677,927 A | 10/1997 | Fullerton et al. |

(Continued)

FOREIGN PATENT DOCUMENTS

EP 0 849 664 A2 6/1998

(Continued)

OTHER PUBLICATIONS

Daniel Socek et al., Short Paper: Enhanced 1-D Chaotic key Based Algorithm for Image Encryption, Sep. 2005, IEEE.*

(Continued)

*Primary Examiner* — David C. Payne
*Assistant Examiner* — Wednel Cadeau
(74) *Attorney, Agent, or Firm* — Fox Rothschild, LLP; Robert J. Sacco

(57) ABSTRACT

Methods for code-division multiplex communications. The method involve generating orthogonal or statistically orthogonal chaotic spreading codes ($CSC_1, \ldots, CSC_K$) having different static offsets using a set of polynomial equations ($f_0(x(nT)), \ldots, f_{N-1}(x(nT))$ and/or $f_0[x((n+v)T+t)], \ldots, f_{N-1}[x((n+v)T+t)]$). The methods also involve forming spread spectrum communications signals respectively using the orthogonal or statistically orthogonal chaotic spreading codes. The methods further involve concurrently transmitting the spread spectrum communications signals over a common RF frequency band. The spreading codes are generated using different initial values for a variable "x" of a polynomial equation $f(x(nT))$ and/or different acc-dec values for a variable "v" of a polynomial equation $f[x((n+v)T+t)]$. The static offsets are defined by the different initial values for a variable "x" and/or different acc-dec values for a variable "v".

16 Claims, 12 Drawing Sheets

U.S. PATENT DOCUMENTS

| | | | |
|---|---|---|---|
| 5,680,462 A | 10/1997 | Miller et al. | |
| 5,757,923 A | 5/1998 | Koopman, Jr. | |
| 5,811,998 A | 9/1998 | Lundberg et al. | |
| 5,852,630 A | 12/1998 | Langberg et al. | |
| 5,900,835 A | 5/1999 | Stein | |
| 5,923,760 A | 7/1999 | Abarbanel et al. | |
| 5,924,980 A | 7/1999 | Coetzee | |
| 5,937,000 A | 8/1999 | Lee et al. | |
| 6,023,612 A | 2/2000 | Harris et al. | |
| 6,038,317 A | 3/2000 | Magliveras et al. | |
| 6,078,611 A | 6/2000 | La Rosa et al. | |
| 6,141,786 A | 10/2000 | Cox et al. | |
| 6,212,239 B1 | 4/2001 | Hayes | |
| 6,304,216 B1 | 10/2001 | Gronemeyer | |
| 6,304,556 B1 | 10/2001 | Haas | |
| 6,310,906 B1 | 10/2001 | Abarbanel et al. | |
| 6,314,187 B1 | 11/2001 | Menkhoff et al. | |
| 6,331,974 B1* | 12/2001 | Yang et al. | 370/342 |
| 6,377,782 B1 | 4/2002 | Bishop et al. | |
| 6,473,448 B1 | 10/2002 | Shono et al. | |
| 6,570,909 B1 | 5/2003 | Kansakoski et al. | |
| 6,614,914 B1 | 9/2003 | Rhoads et al. | |
| 6,665,692 B1 | 12/2003 | Nieminen | |
| 6,732,127 B2 | 5/2004 | Karp | |
| 6,744,893 B1 | 6/2004 | Fleming-Dahl | |
| 6,754,251 B1 | 6/2004 | Sriram et al. | |
| 6,766,345 B2 | 7/2004 | Stein et al. | |
| 6,842,479 B2 | 1/2005 | Bottomley | |
| 6,842,745 B2 | 1/2005 | Occhipinti et al. | |
| 6,864,827 B1 | 3/2005 | Tise et al. | |
| 6,865,218 B1 | 3/2005 | Sourour | |
| 6,888,813 B1 | 5/2005 | Kishi | |
| 6,901,104 B1 | 5/2005 | Du et al. | |
| 6,937,568 B1 | 8/2005 | Nicholl et al. | |
| 6,980,656 B1 | 12/2005 | Hinton, Sr. et al. | |
| 6,980,657 B1 | 12/2005 | Hinton, Sr. et al. | |
| 6,986,054 B2 | 1/2006 | Kaminaga et al. | |
| 6,993,016 B1 | 1/2006 | Liva et al. | |
| 6,999,445 B1 | 2/2006 | Dmitriev et al. | |
| 7,023,323 B1 | 4/2006 | Nysen | |
| 7,027,598 B1 | 4/2006 | Stojancic et al. | |
| 7,035,220 B1 | 4/2006 | Simcoe | |
| 7,069,492 B2 | 6/2006 | Piret et al. | |
| 7,076,065 B2 | 7/2006 | Sherman et al. | |
| 7,078,981 B2 | 7/2006 | Farag | |
| 7,079,651 B2 | 7/2006 | Den Boer et al. | |
| 7,095,778 B2 | 8/2006 | Okubo et al. | |
| 7,133,522 B2 | 11/2006 | Lambert | |
| 7,170,997 B2 | 1/2007 | Petersen et al. | |
| 7,190,681 B1 | 3/2007 | Wu | |
| 7,200,225 B1 | 4/2007 | Schroeppel | |
| 7,233,969 B2 | 6/2007 | Rawlins et al. | |
| 7,233,970 B2 | 6/2007 | North et al. | |
| 7,245,723 B2 | 7/2007 | Hinton, Sr. et al. | |
| 7,269,198 B1 | 9/2007 | Elliott et al. | |
| 7,269,258 B2 | 9/2007 | Ishihara et al. | |
| 7,272,168 B2 | 9/2007 | Akopian | |
| 7,277,540 B1 | 10/2007 | Shiba et al. | |
| 7,286,802 B2 | 10/2007 | Beyme et al. | |
| 7,310,309 B1 | 12/2007 | Xu | |
| 7,349,381 B1 | 3/2008 | Clark et al. | |
| 7,423,972 B2 | 9/2008 | Shaham et al. | |
| 7,529,292 B2 | 5/2009 | Bultan et al. | |
| 7,643,537 B1 | 1/2010 | Giallorenzi et al. | |
| 7,725,114 B2 | 5/2010 | Feher | |
| 7,779,060 B2 | 8/2010 | Kocarev et al. | |
| 7,830,214 B2 | 11/2010 | Han et al. | |
| 7,853,014 B2 | 12/2010 | Blakley et al. | |
| 7,929,498 B2 | 4/2011 | Ozluturk et al. | |
| 7,974,146 B2 | 7/2011 | Barkley | |
| 2001/0017883 A1 | 8/2001 | Tiirola et al. | |
| 2002/0012403 A1 | 1/2002 | McGowan et al. | |
| 2002/0034191 A1 | 3/2002 | Shattil | |
| 2002/0034215 A1 | 3/2002 | Inoue et al. | |
| 2002/0041623 A1 | 4/2002 | Umeno | |
| 2002/0054682 A1 | 5/2002 | Di Bernardo et al. | |
| 2002/0099746 A1 | 7/2002 | Tie et al. | |
| 2002/0110182 A1 | 8/2002 | Kawai | |
| 2002/0115461 A1 | 8/2002 | Shiraki et al. | |
| 2002/0122465 A1 | 9/2002 | Agee et al. | |
| 2002/0128007 A1 | 9/2002 | Miyatani | |
| 2002/0172291 A1 | 11/2002 | Maggio et al. | |
| 2002/0174152 A1 | 11/2002 | Terasawa et al. | |
| 2002/0176511 A1 | 11/2002 | Fullerton et al. | |
| 2002/0186750 A1 | 12/2002 | Callaway et al. | |
| 2003/0007639 A1 | 1/2003 | Lambert | |
| 2003/0016691 A1 | 1/2003 | Cho | |
| 2003/0044004 A1 | 3/2003 | Blakley et al. | |
| 2003/0156603 A1 | 8/2003 | Rakib et al. | |
| 2003/0182246 A1 | 9/2003 | Johnson et al. | |
| 2003/0198184 A1 | 10/2003 | Huang et al. | |
| 2004/0001556 A1 | 1/2004 | Harrison et al. | |
| 2004/0059767 A1 | 3/2004 | Liardet | |
| 2004/0092291 A1 | 5/2004 | Legnain et al. | |
| 2004/0100588 A1 | 5/2004 | Hartson et al. | |
| 2004/0146095 A1 | 7/2004 | Umeno et al. | |
| 2004/0156427 A1 | 8/2004 | Gilhousen et al. | |
| 2004/0161022 A1 | 8/2004 | Glazko et al. | |
| 2004/0165681 A1 | 8/2004 | Mohan | |
| 2004/0184416 A1 | 9/2004 | Woo | |
| 2004/0196212 A1 | 10/2004 | Shimizu | |
| 2004/0196933 A1 | 10/2004 | Shan et al. | |
| 2005/0004748 A1 | 1/2005 | Pinto et al. | |
| 2005/0021308 A1 | 1/2005 | Tse et al. | |
| 2005/0031120 A1 | 2/2005 | Samid | |
| 2005/0050121 A1 | 3/2005 | Klein et al. | |
| 2005/0075995 A1 | 4/2005 | Stewart et al. | |
| 2005/0089169 A1 | 4/2005 | Kim et al. | |
| 2005/0129096 A1 | 6/2005 | Zhengdi et al. | |
| 2005/0207574 A1 | 9/2005 | Pitz et al. | |
| 2005/0249271 A1 | 11/2005 | Lau et al. | |
| 2005/0259723 A1 | 11/2005 | Blanchard | |
| 2005/0265430 A1 | 12/2005 | Ozluturk et al. | |
| 2005/0274807 A1 | 12/2005 | Barrus et al. | |
| 2006/0072754 A1 | 4/2006 | Hinton et al. | |
| 2006/0088081 A1 | 4/2006 | Withington et al. | |
| 2006/0093136 A1 | 5/2006 | Zhang et al. | |
| 2006/0123325 A1 | 6/2006 | Wilson et al. | |
| 2006/0209926 A1 | 9/2006 | Umeno et al. | |
| 2006/0209932 A1 | 9/2006 | Khandekar et al. | |
| 2006/0239334 A1 | 10/2006 | Kwon et al. | |
| 2006/0251250 A1 | 11/2006 | Ruggiero et al. | |
| 2006/0264183 A1 | 11/2006 | Chen et al. | |
| 2007/0098054 A1 | 5/2007 | Umeno | |
| 2007/0121945 A1 | 5/2007 | Han et al. | |
| 2007/0133495 A1 | 6/2007 | Lee et al. | |
| 2007/0149232 A1 | 6/2007 | Koslar | |
| 2007/0195860 A1 | 8/2007 | Yang et al. | |
| 2007/0201535 A1 | 8/2007 | Ahmed | |
| 2007/0230701 A1 | 10/2007 | Park et al. | |
| 2007/0253464 A1 | 11/2007 | Hori et al. | |
| 2007/0291833 A1 | 12/2007 | Shimanskiy | |
| 2008/0008320 A1 | 1/2008 | Hinton et al. | |
| 2008/0016431 A1 | 1/2008 | Lablans | |
| 2008/0075195 A1 | 3/2008 | Pajukoski et al. | |
| 2008/0080439 A1 | 4/2008 | Aziz et al. | |
| 2008/0084919 A1 | 4/2008 | Kleveland et al. | |
| 2008/0095215 A1 | 4/2008 | McDermott et al. | |
| 2008/0107268 A1 | 5/2008 | Rohde et al. | |
| 2008/0198832 A1 | 8/2008 | Chester | |
| 2008/0204306 A1 | 8/2008 | Shirakawa | |
| 2008/0263119 A1 | 10/2008 | Chester et al. | |
| 2008/0294707 A1 | 11/2008 | Suzuki et al. | |
| 2008/0294710 A1 | 11/2008 | Michaels | |
| 2008/0294956 A1 | 11/2008 | Chester et al. | |
| 2008/0304553 A1 | 12/2008 | Zhao et al. | |
| 2008/0304666 A1* | 12/2008 | Chester et al. | 380/263 |
| 2008/0307022 A1 | 12/2008 | Michaels et al. | |
| 2008/0307024 A1 | 12/2008 | Michaels et al. | |
| 2009/0022212 A1 | 1/2009 | Ito et al. | |
| 2009/0034727 A1 | 2/2009 | Chester et al. | |
| 2009/0044080 A1 | 2/2009 | Michaels et al. | |
| 2009/0059882 A1 | 3/2009 | Hwang et al. | |
| 2009/0110197 A1 | 4/2009 | Michaels | |
| 2009/0122926 A1 | 5/2009 | Azenkot et al. | |
| 2009/0196420 A1 | 8/2009 | Chester et al. | |
| 2009/0202067 A1 | 8/2009 | Michaels et al. | |

| | | | |
|---|---|---|---|
| 2009/0245327 A1 | 10/2009 | Michaels | |
| 2009/0279688 A1 | 11/2009 | Michaels et al. | |
| 2009/0279690 A1 | 11/2009 | Michaels et al. | |
| 2009/0285395 A1 | 11/2009 | Hu et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0316679 A1 | 12/2009 | Van Der Wateren | |
| 2009/0323766 A1 | 12/2009 | Wang et al. | |
| 2009/0327387 A1 | 12/2009 | Michaels et al. | |
| 2010/0030832 A1 | 2/2010 | Mellott | |
| 2010/0054225 A1 | 3/2010 | Hadef et al. | |
| 2010/0073210 A1 | 3/2010 | Bardsley et al. | |
| 2010/0111296 A1 | 5/2010 | Brown et al. | |
| 2010/0142593 A1 | 6/2010 | Schmid | |
| 2010/0254430 A1 | 10/2010 | Lee et al. | |
| 2010/0260276 A1 | 10/2010 | Orlik et al. | |
| 2011/0222393 A1 | 9/2011 | Kwak et al. | |

FOREIGN PATENT DOCUMENTS

| | | |
|---|---|---|
| EP | 0 949 563 | 10/1999 |
| EP | 2 000 900 A2 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2005017612 A | 1/2005 |
| WO | WO-0135572 A2 | 5/2001 |
| WO | WO-2006 110954 | 10/2006 |
| WO | WO 2008065191 | 6/2008 |
| WO | WO-2008099367 A2 | 8/2008 |
| WO | WO-2008130973 A1 | 10/2008 |
| WO | WO 2009146283 | 12/2009 |

OTHER PUBLICATIONS

M. Panella et al., An RNS Architecture for Quasi-chaotic Oscillators, 2003, Journal of VLSI Signal Processing Kluwer Academic Publishers.*

Y Soobul et al., Digital Chaotic Coding and Modulation in CDMA, 2002, IEEE.*

Panella et al., An RNS Architecture for Quasi-Chaotic Oscillators, Aug. 2003,Kluwer Academic Publishers, 199-220.*

Panella et al., An RNS Architechture for Quasi-Chaotic Oscillators, Aug. 2003, Kluwer Academic Publishers, 199-220.*

Panella et al., An RNS Architechture for Quasi-Chaotic Oscillators, Aug. 2003, Kluwer Academic Publishsers, 199-220.*

Soobul et al., Digital Chaotic Coding and Modulation in CDMA, 2003, IEEE Africon.*

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

Lai, X., et al., "A Proposal for a New Block Encryption Standard" Advances in Cryptology—Eurocrypt '90, Workshop on the Theory and Application of Cryptographic Techniques Proceedings, Springer-Verlag Berlin, Germany, 1998, pp. 389-404, XP000617517.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Injection:, From MathWorld—AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., European Search Report mailed Mar. 4, 2010, Patent Application No. 08009745.4.

Bererber, S.M., et al., "Design of a CDMA Sysetm in FPGA Technology", Vehicular Technology Conference, 2007. VTC2007-Spring. IEEE 65$^{th}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Soobul, Y., et al. "Digital chaotic coding and modulation in CDMA" IEEE Africon 2002 Oct. 2, 2002, Oct. 4, 2002, pp. 841-846, XP002575052 Retrieved from the Internet: URL:http://ieeexplore.ieee.org> [retrieved on Mar. 23, 2010].

El-Khamy S E: "New trends in wireless multimedia communications based on chaos and fractals" National Radio Science Conference, 2004. NRSC 2004. Proceedings of the Twenty-First Cairo, Egypt March 16-18, 2004, Piscataway, NJ, USA,IEEE, Mar. 16, 2004, pp. 1-11, XP010715117 ISBN: 978-977-5031-77-8.

Rabiner, Lawrence R., "A Tutorial on Hidden Markov Models and Selected Applications in Speech Recognition", Proceedings of the IEEE, vol. 77, No. 2, Feb. 1989.

Aparicio; Communications Systems Based on Chaos, May 2007. Universidad Rey Juan Carlos.

Abel, et al., "Chaos Communications—Principles, Schemes, and System Analysis" Proceedings for the IEEE, IEEE. New York, NY. vol. 90, No. 5, May 1, 2002, XP011064997, ISSN: 0018-9219.

Barile, Margherita, "Bijective," From MathWorld—A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. Comsware 2007. 2nd International Conference ON, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m−1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource, http://mathworld.wolfram.com/Surjection.html.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable PAPR Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Taylor, F.J., "Residue Arithmetic A Tutorial with Examples", Computer, vol. 17, No. 5, pp. 50-62, May 1984, doi: 10.1109/MC.1984.1659138.

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H. , Dynamic Galois Theory., Journal of Symbolic Computation; Dec. 2010, vol. 45 Issue 12, p. 1316-1329, 14p.

Galias, Z., et al., "Quadrature Chaos—Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Office Action issued in Japanese Patent Application No. 2010-504206 in the name of Harris Corporation; mailed Jan. 6, 2012.

Bender, et al., "Techniques for data hiding", 1995, IBM Systems Journal, vol. 35, pp. 313-336.

* cited by examiner $1^{st}$ Chaotic Spreading Code $CSC_1 = [y_1\ y_2\ y_3\ \cdots\ y_{s-4}\ y_{s-3}\ y_{s-2}\ y_{s-1}\ y_s]$ $2^{nd}$ Chaotic Spreading Code $CSC_2 = [y_{s-4}\ y_{s-3}\ y_{s-2}\ y_{s-1}\ y_s\ y_1\ y_2\ y_3\ \cdots\ y_{s-5}]$ $N^{th}$ Chaotic Spreading Code $CSC_K = [y_{s-54}\ y_{s-53}\ \cdots\ y_{s-4}\ y_{s-3}\ y_{s-2}\ y_{s-1}\ y_s\ y_1\ y_2\ y_3\ \ldots\ y_{s-5}\ \cdots\ y_{s-55}]$

FIG. 3A $1^{st}$ Chaotic Spreading Code $CSC_1 = [y_{s-k1}\ y_{s-k1+1}\ y_{s-k1+2}\ \cdots\ y_{s-k1-3}\ y_{s-k1-2}\ y_{s-k1-1}]$ $2^{nd}$ Chaotic Spreading Code $CSC_2 = [y_{s-k2}\ y_{s-k2+1}\ y_{s-k2+2}\ \cdots\ y_{s-k2-3}\ y_{s-k2-2}\ y_{s-k2-1}]$ $N^{th}$ Chaotic Spreading Code $CSC_K = [y_{s-kN}\ y_{s-kN+1}\ y_{s-kN+2}\ \cdots\ y_{s-kN-3}\ y_{s-kN-2}\ y_{s-kN-1}]$

FIG. 3B

COMMUNICATIONS SYSTEM EMPLOYING CHAOTIC SPREADING CODES WITH STATIC OFFSETS

BACKGROUND OF THE INVENTION

1. Statement of the Technical Field

The invention concerns communications systems. More particularly, the invention concerns communications systems having a plurality of transmitters which communicate with corresponding receivers using spread spectrum waveforms.

2. Description of the Related Art

Pseudorandom number generators (PRNG) generally utilize digital logic or a digital computer and one or more algorithms to generate a sequence of numbers. While the output of conventional PRNG may approximate some of the properties of random numbers, they are not truly random. For example, the output of a PRNG has cyclo-stationary features that can be identified by analytical processes.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate chaotic number sequences requires an impractical implementation due to the precisions required.

Communications systems utilizing chaotic sequences offer promise for being the basis of a next generation of low probability of intercept (LPI) waveforms, low probability of detection (LPD) waveforms, and secure waveforms. While many such communications systems have been developed for generating chaotically modulated waveforms, such communications systems suffer from low throughput. The term "throughput", as used herein, refers to the amount of data transmitted over a data link during a specific amount of time. This throughput limitation stems from the fact that a chaotic signal is produced by means of a chaotic analog circuit subject to drift.

The throughput limitation with chaos based communication systems can be traced to the way in which chaos generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift", as used herein, refers to a slow long term variation in one or more parameters of a circuit. The problem with such analog circuits is that the inherent drift forces the requirement that state information must be constantly transferred over a communication channel to keep a transmitter and receiver synchronized.

The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

The alternative to date has been to implement non-coherent chaotic waveforms. However, non-coherent waveform based communication systems suffer from reduced throughput and error rate performance. In this context, the phrase "non-coherent waveform" means that the receiver is not required to reproduce any synchronized copy of the chaotic signals that have been generated in the transmitter. The phrase "communications using a coherent waveform" means that the receiver is required to reproduce a synchronized copy of the chaotic signals that have been generated in the transmitter.

In view of the forgoing, there is a need for a coherent chaos-based communications system having an increased throughput. There is also a need for a chaos-based communications system configured for generating a signal having chaotic properties. As such, there is further a need for a chaos-based communications system that corrects drift between a transmitter and a receiver without an extreme compromise of throughput.

SUMMARY OF THE INVENTION

The present invention concerns communication systems and methods for code-division multiplex communications. The method involved generating orthogonal or statistically orthogonal chaotic spreading codes having different static offsets using a set of polynomial equations. The methods also involve forming spread spectrum communications signals respectively using the orthogonal or statistically orthogonal chaotic spreading codes. The methods further involve concurrently transmitting the spread spectrum communications signals over a common RF frequency band.

According to an aspect of the invention, the spreading codes can be generated using different initial values for a variable "x" of a polynomial equation $f(x(nT))$. "n" is an index of time. "t" is a variable representing an initial time offset. "T" is a discrete time interval. The spreading codes can also be generated using different acc-dec values for a variable "v" of a polynomial equation $f[x((n+v)T+t)]$, where "v" is a variable having a value selected to accelerate or decelerate a chaotic sequence generation by at least one cycle. The acc-dec variable "v" can be defined by a mathematical expression "c modulo $m_i$", where c is a number of cycles for acceleration or deceleration and $m_i$ is a value indicating a cycle in which a chaotic sequence starts to repeat.

According to another aspect of the invention, the spreading codes are generated using residue number system (RNS) arithmetic operations to determine solutions for the set of polynomial equations. The solutions are iteratively computed and expressed as RNS residue values. The spreading codes can also be generated by determining a series of digits in a weighted number system based on the RNS residue values. The spreading codes can further be generated by selecting a value for each of N moduli in an RNS used for solving the set of polynomial equations. A plurality of relatively prime numbers can be selected for use as modulus in solving the set of polynomial equations.

According to another aspect of the invention, the methods involve receiving the spread spectrum communications signals at a receiver, generating at least one chaotic de-spreading code, and de-spreading at least one of the spread spectrum communications signals using the chaotic de-spreading code. The chaotic de-spreading code can be synchronized in time and frequency with at least one of the orthogonal or statistically orthogonal chaotic spreading codes.

The code-division multiplex communication systems include a plurality of transmitters implementing the above described methods. In this regard, it should be understood that the transmitters are configured for generating the orthogonal or statistically orthogonal chaotic spreading codes having different static offsets using the set of polynomial equations. The transmitters are also configured for forming the spread spectrum communications signals respectively using the orthogonal or statistically orthogonal chaotic spreading codes. The transmitters are further configured for concurrently transmitting the spread spectrum communications signals over the common RF frequency band.

BRIEF DESCRIPTION OF THE DRAWINGS

Embodiments will be described with reference to the following drawing figures, in which like numerals represent like items throughout the figures, and in which:

FIGS. 3A-3B collectively provide schematic illustrations of a plurality of chaotic spreading codes according to embodiments of the invention.

DETAILED DESCRIPTION OF THE PREFERRED EMBODIMENTS

Figure 1:
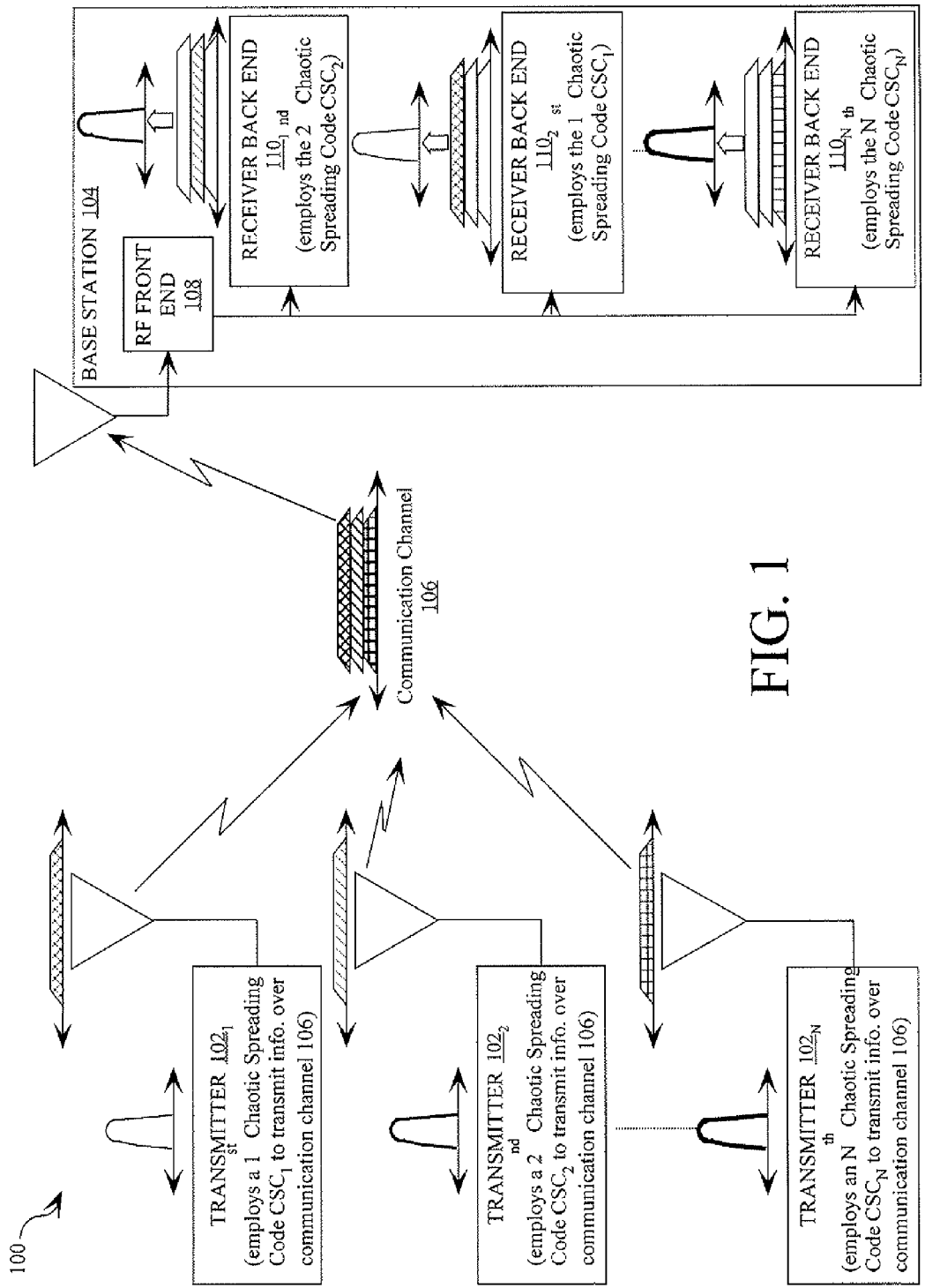
FIG. 1 is a schematic illustration of a first exemplary coherent chaotic spread-spectrum communication system according to an embodiment of the invention.

Embodiments of the present invention will now be described with respect to FIGS. 1-2. Embodiments of the present invention relate to Code Division Multiplexing (CDM) based communications systems. CDM based communications systems according to embodiments of the present invention generally allow signals from a series of independent sources to be transmitted at the same time over the same frequency band. The signals transmissions are accomplished using orthogonal or statistically orthogonal spreading codes to spread each signal over a large, common frequency band. The orthogonal or statistically orthogonal spreading codes are advantageously chaotic spreading codes. The orthogonal or statistically orthogonal spreading codes have static offsets, i.e., the orthogonal or statistically orthogonal spreading codes are numerical sequences cyclically shifted a number of places to the right or left. The CDM based communications systems also allow transmitted signals to be received at one or more receivers. At the receivers, the appropriate orthogonal or statistically orthogonal spreading codes are used to recover the original signals intended for a particular user.

It should be appreciated that the CDM based communications systems disclosed herein have many advantages as compared to conventional spread-spectrum communications systems. The CDM based communications systems disclosed herein also have many advantages over chaos based spread spectrum systems utilizing analog based chaotic sequence generators. For example, the CDM based communications systems provide output signals with a much smaller bandwidth as compared to the bandwidths of output signals generated by conventional code division multiple access (CDMA) based communications systems. The bandwidth efficiency results from the fact that the chaotic spreading signal has multilevel and random amplitudes. In one embodiment of the present invention, the amplitude distribution is Gaussian. As a result, the cross correlation between two spreading sequences is impulsive and the statistical orthogonality is more robust. The robust statistical orthogonality translates to a lower chipping rate for a fixed orthogonality versus a conventional CDMA system. In effect, there is a reduced bandwidth requirement. Conversely, the CDM based communications systems of the present invention can handle a relatively larger number of users in a fixed bandwidth. The CDM based communications systems disclosed herein also correct clock drifts between a transmitter and a receiver without an extreme compromise of throughput.

Before describing the communications systems of the present invention, it will be helpful in understanding an exemplary environment in which the invention can be utilized. In this regard, it should be understood that the communications systems of the present invention can be utilized in a variety of different applications where the frequency re-use of a communications channel needs to be increased. Such applications include, but are not limited to, military applications and commercial mobile/cellular telephone applications.

Communications Systems

Referring now to FIG. 1, there is provided a schematic illustration of a first exemplary coherent chaotic spread-spectrum communication system 100 according to an embodiment of the invention. As shown in FIG. 1, the communication system 100 is comprised of a plurality of transmitters $102_1, \ldots, 102_N$ and a base station 104. The transmitters $102_1, \ldots, 102_N$ are generally configured to generate output signals having chaotic properties. Each of the output signals are generated using a coherent chaotic sequence spread spectrum (CCSSS) method. The CCSSS method generally involves combining data symbols (e.g., phase shift keying symbols) with a higher rate chaotic spreading code $CSC_1, \ldots, CSC_N$. The chaotic spreading codes $CSC_1, \ldots,$ $CSC_N$ are analogous to binary pseudo-noise spreading sequences or chipping codes employed by conventional direct sequence spread spectrum (DSSS) systems. The chaotic spreading codes $CSC_1, \ldots, CSC_N$ spread the spectrum of the data symbols according to a spreading ratio. The resulting signals resemble truly random signals.

Notably, the chaotic spreading codes $CSC_1, \ldots, CSC_N$ are orthogonal or statistically orthogonal chaotic spreading codes with static offsets. The phrase "statistically orthogonal", as used herein, means that the expected value of an inner product of two chaotic sequences over an interval is zero. A schematic illustration of exemplary orthogonal or statistically orthogonal chaotic spreading codes $CSC_1, \ldots, CSC_N$ with static offsets is provided in FIGS. 3A-3B. As shown in FIG. 3A, each of the orthogonal or statistically orthogonal chaotic spreading codes $CSC_2, \ldots, CSC_N$ is the orthogonal or statistically orthogonal chaotic spreading code $CSC_1$ cyclically shifted a certain number of places to the right. For example, the orthogonal or statistically orthogonal chaotic spreading code $CSC_2$ is the same chaotic sequence as the orthogonal or statistically orthogonal chaotic spreading code $CSC_1$. However, the chaotic sequence of the orthogonal or statistically orthogonal chaotic spreading code $CSC_2$ is cyclically shifted four (4) places to the right. Similarly, the orthogonal or statistically orthogonal chaotic spreading code $CSC_N$ is the same chaotic sequence as the orthogonal or statistically orthogonal chaotic spreading code $CSC_1$. However, the chaotic sequence of the orthogonal or statistically orthogonal chaotic spreading code $CSC_N$ is cyclically shifted fifty-four (54) places to the right. The invention is not limited in this regard. For example, the orthogonal or statistically orthogonal chaotic spreading codes $CSC_2, \ldots, CSC_N$ can be cyclically shifted versions of a chaotic sequence, wherein the cyclic shifts are cyclic shifts to the right or cyclic shift to the left.

The orthogonal or statistically orthogonal chaotic spreading codes $CSC_2, \ldots, CSC_N$ can be generalized as shown in FIG. 3B. In FIG. 3B, the terms "k1", "k2", and "kN" represent the initial condition for a chaotic sequence starting location. Notably, the rotation of indices can be provided using modulo operations. These modulo operations can be defined by the mathematical expression: modulo s, where s is the total sequence length. The terms "k1", "k2", and "kN" can be selected according to a deterministic process or selected according to a random process. A deterministic process can generally involve segmenting an overall chaotic sequence to users. A random process can generally be performed to prevent unintended users from listening to other conversations.

Referring again to FIG. 1, the series of independent transmitters $102_1, \ldots, 102_N$ are configured to transmit information (or output signals) to the base station 104. The information (or output signals) can be transmitted from the transmitters $102_1, \ldots, 102_N$ at the same time over the same communications channel 106 (or frequency band).

As shown in FIG. 1, the base station 104 is comprised of a radio frequency (RF) front end 108 and a plurality of receiver back ends $110_1, \ldots, 110_N$. The RF front end 108 is generally configured for receiving signals transmitted from the transmitters $102_1, \ldots, 102_N$, placing the received signals in a form suitable for processing by the receiver back ends $110_1, \ldots, 110_N$, and communicating the received signals to the receiver back ends $110_1, \ldots, 110_N$. Embodiments of the RF front end 108 will be described below in relation to FIG. 5 and FIG. 7.

The receiver back ends $110_1, \ldots, 110_N$ are configured for removing the randomness of the received signals to recover the original information (or data). In particular, the information (or data) is recovered by de-spreading the received signals using the appropriate orthogonal or statistically orthogonal chaotic spreading codes $CSC_1, \ldots, CSC_N$. In this regard, it should be understood that each of the receiver back ends $110_1, \ldots, 110_N$ is configured to generate a replica of a particular orthogonal or statistically orthogonal chaotic spreading code $CSC_1, \ldots, CSC_N$. For example, the receiver back end $110_1$ is configured to generate a replica of the orthogonal or statistically orthogonal chaotic spreading code $CSC_1$ that is synchronized in time and frequency with the orthogonal or statistically orthogonal chaotic spreading code $CSC_1$. Similarly, the receiver back end $110_2$ is configured to generate a replica of the orthogonal or statistically orthogonal chaotic spreading code $CSC_2$ that is synchronized in time and frequency with the orthogonal or statistically orthogonal chaotic spreading code $CSC_2$, and so on. Embodiments of the receiver back ends $110_1, \ldots, 110_N$ will be described below in relation to FIG. 6 and FIG. 8.

Figure 2:
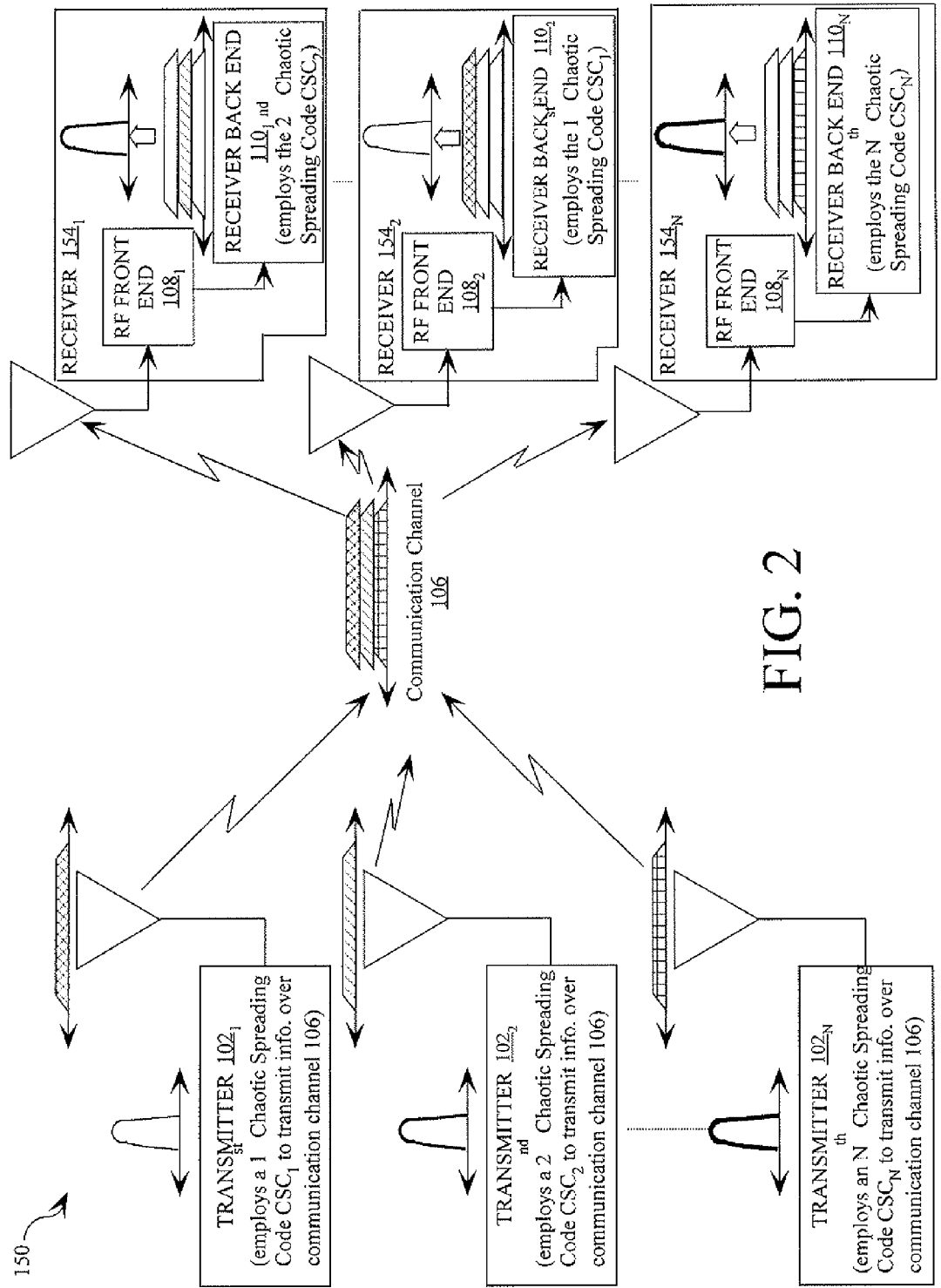
FIG. 2 is a schematic illustration of a second exemplary coherent chaotic spread-spectrum communication system according to an embodiment of the invention.

Referring now to FIG. 2, there is provided a schematic illustration of a second exemplary coherent chaotic spread-spectrum communication system 150 according to an embodiment of the invention. As shown in FIG. 2, the communication system 150 is comprised of a plurality of transmitters $102_1, \ldots, 102_N$ and a plurality of receivers $154_1, \ldots, 154_N$. The transmitters $102_1, \ldots, 102_N$ are the same as the transmitters of FIG. 1. As such, the description provided above in relation to the transmitters $102_1, \ldots, 102_N$ is sufficient for understanding the communication system 150.

Each of the receivers $154_1, \ldots, 154_N$ is comprised of an RF front end $108_1, \ldots, 108_N$ and a receiver back end $110_1, \ldots, 110_N$. The RF front ends $108_1, \ldots, 108_K$ are the same as or substantially similar to the RF front end 108 of FIG. 1. As such, the description provided above in relation to the RF front end 108 is sufficient for understanding the RF front ends $108_1, \ldots, 108_N$. Similarly, the receiver back ends $110_1, \ldots, 110_N$ are the same as the receiver back ends of FIG. 1. As such, the description provided above in relation to the receiver back ends $110_1, \ldots, 110_N$ is sufficient for understanding the communication system 150.

Transmitter Architectures

Figure 4:
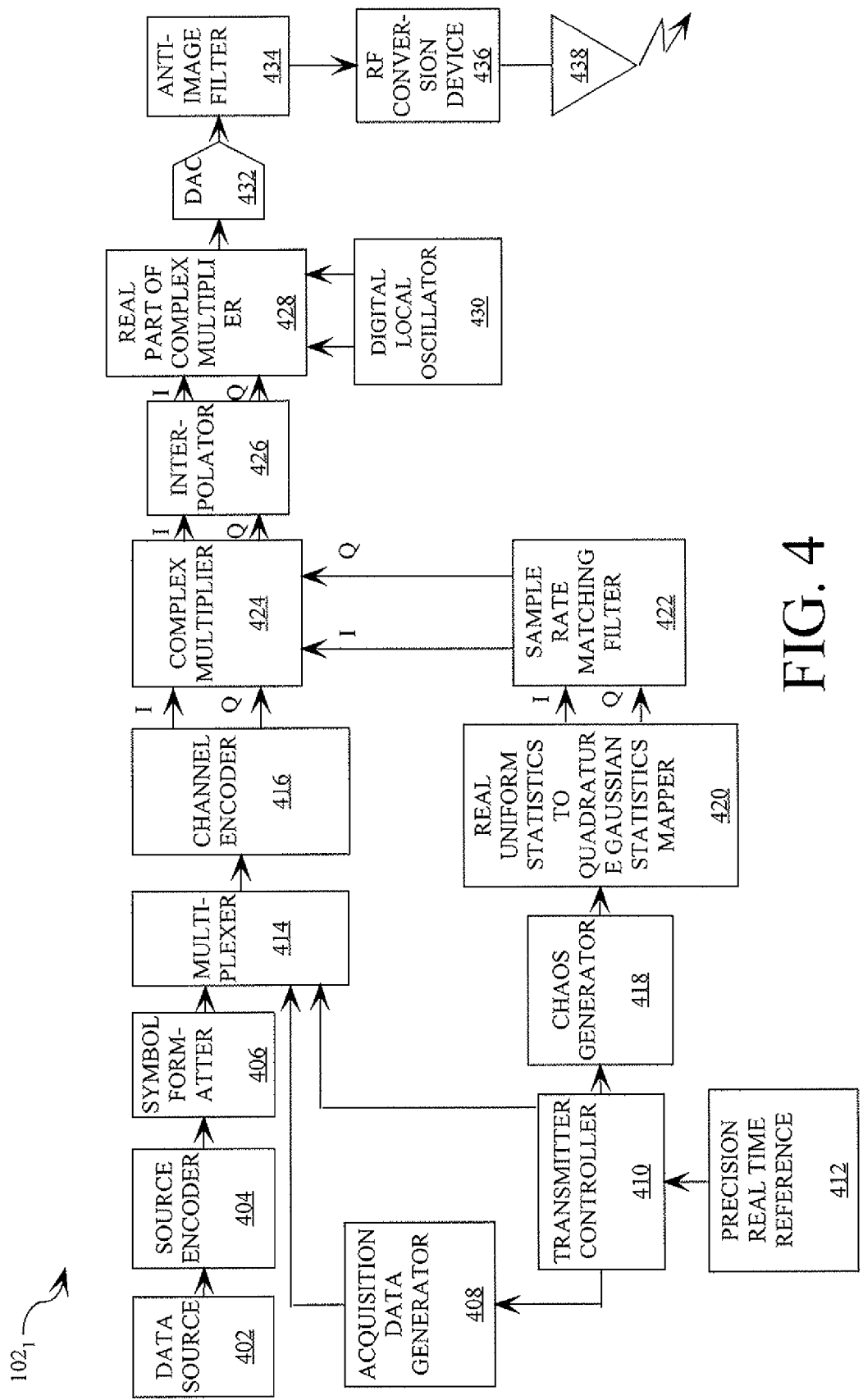
FIG. 4 is a block diagram of the transmitter shown in FIGS. 1-2 according to an embodiment of the invention.

Referring now to FIG. 4, there is provided a block diagram of the transmitter $102_1$ shown in FIGS. 1 and 2. The embodiment of the transmitter $102_1$ assumes that: (1) a low order phase shift keying (PSK) data modulation is used; (2) no pulse shaping is applied to data symbols; (3) modulated data symbols are generated in quadrature form; and (4) chaotic spectral spreading is performed at an intermediate frequency (IF). The transmitters $102_2, \ldots, 102_N$ are the same as or substantially similar to the transmitter $102_1$. As such, the following description of the transmitter $102_1$ is sufficient for understanding the transmitters $102_2, \ldots, 102_N$.

Referring again to FIG. 4, the transmitter $102_1$ is generally configured for generating an amplitude-and-time-discrete baseband signal. The transmitter $102_1$ is also configured for spreading the amplitude-and-time-discrete baseband signal over a wide intermediate frequency band. This spreading consists of multiplying the amplitude-and-time-discrete baseband signal by a digital chaotic sequence. The product of this arithmetic operation is hereinafter referred to as a digital chaotic signal. In this regard, it should be understood that the transmitter $102_1$ is also configured to process the digital chaotic signal to place the same in a proper analog form suitable for transmission over a communications link. The transmitter $102_1$ is further configured to communicate analog chaotic signals to a base station 104 (described above in relation to FIG. 1) and/or a receiver $154_1, \ldots, 154_N$ (described above in relation to FIG. 2) via a communications link.

As shown in FIG. 4, the transmitter $102_1$ is comprised of a data source 402, a source encoder 404, a symbol formatter 406, an acquisition data generator 408, a transmitter controller 410, a multiplexer 414, a channel encoder 416, a precision real time reference 412, and a complex multiplier 424. The transmitter $102_1$ is also comprised of a chaos generator 418, a real uniform statistics to quadrature Gaussian statistics mapper device (RUQG) 420, and a sample rate matching filter (SRMF) 422. The transmitter $102_1$ is further comprised of an interpolator 426, a digital local oscillator (LO) 430, a real part of a complex multiplier 428, a digital-to-analog converter (DAC) 432, an anti-image filter 434, an intermediate frequency (IF) to radio frequency (RF) conversion device 436, and an antenna element 438.

The data source 402 is an interface configured for receiving an input signal containing data from an external device (not shown). As such, the data source 402 can be configured for receiving bits of data from the external data source (not shown). The data source 402 can further be configured for supplying bits of data to the source encoder 404 at a particular data transfer rate.

The source encoder 404 can be configured to encode the data received from the external device (not shown) using a forward error correction coding scheme. The bits of data received at or generated by the source encoder 404 represent any type of information that may be of interest to a user. For example, the data can be used to represent text, telemetry, audio, or video data. The source encoder 404 can further be configured to supply bits of data to the symbol formatter 406 at a particular data transfer rate.

The symbol formatter 406 is generally configured to process bits of data for forming channel encoded symbols. In a preferred embodiment, the source encoded symbols are phase shift keyed (PSK) encoded. If it is desired to use a non-coherent form of PSK with the coherent chaos spread spectrum system, then the symbol formatter 404 can also be configured for differentially encoding formed PSK symbols. Differential encoding is well known to persons having ordinary skill in the art, and therefore will not be described herein. The symbol formatter 406 can further be configured for communicating non-differentially encoded PSK symbols and/or differentially encoded PSK symbols to the multiplexer 414.

According to an embodiment of the invention, the symbol formatter 406 is functionally similar to a serial in/parallel out shift register where the number of parallel bits out is equal to log base two ($log_2$) of the order of the channel encoder 416. The symbol formatter 406 is selected for use with a quadrature phase shift keying (QPSK) channel encoder. As such, the symbol formatter 406 is configured for performing a formatting function for grouping two (2) bits of data together to form a QPSK symbol word (i.e., a single two bit parallel word). Thereafter, the symbol formatter 406 communicates the symbol formatted data to the multiplexer 414. Still, the invention is not limited in this regard.

According to another embodiment of the invention, the symbol formatter 406 passes a single bit per symbol time. The symbol formatter 406 is selected for use with a binary phase shift keying (BPSK) channel encoder. As such, the symbol formatter 406 is configured for mapping one bit of data to a BPSK channel encoder. Thereafter, the symbol formatter 406 communicates the BPSK symbol data to the multiplexer 414. Still, the invention is not limited in this regard.

According to another embodiment of the invention, the symbol formatter 406 is selected for use with a sixteen quadrature amplitude modulation (16QAM) channel encoder. As such, the symbol formatter 406 is configured for mapping four (4) bits to a 16QAM symbol input format. Thereafter, the symbol formatter 406 communicates the four (4) bit data word to the multiplexer 414. Still, the invention is not limited in this regard.

According to yet another embodiment of the invention, the symbol formatter 406 is selected for use with a binary amplitude shift keying (ASK) modulator. As such, the symbol formatter 406 is configured to pass one bit of data per symbol time to an ASK channel encoder. Thereafter, the symbol formatter 406 communicates the ASK symbol to the multiplexer 414. Still, the invention is not limited in this regard.

Referring again to FIG. 4, the acquisition data generator 408 is configured for generating a "known data preamble". The "known data preamble" can be a repetition of the same known symbol data or a data series of known data for encoding into known symbols. The "known data preamble" can be used to enable initial synchronization of a chaotic sequence generated in the transmitter $102_1$ and a base station 104 (described above in relation to FIG. 1) or receiver $154_1, \ldots, 154_N$ (described above in relation to FIG. 2). The duration of the "known data preamble" is determined by an amount required by a base station (described above in relation to FIG. 1) or receiver $154_1, \ldots, 154_N$ (described above in relation to FIG. 2) to synchronize with the transmitter $102_1$ under known worst case channel conditions. The acquisition data generator 408 can be further configured for communicating the "known data preamble" to the multiplexer 414.

The multiplexer 414 is configured to receive a binary word (that is to be modulated by the channel encoder 416) from the symbol formatter 406. The multiplexer 414 is also configured to receive the "known data preamble" from the acquisition data generator 408. The multiplexer 414 is coupled to the transmitter controller 410. The transmitter controller 410 is configured for controlling the multiplexer 414 so that the multiplexer 414 routes the "known data preamble" to the channel encoder 416 at the time of a new transmission.

According to alternative embodiments of the invention, the "known data preamble" is stored in a modulated form. In such a scenario, the architecture of FIG. 4 is modified such that the multiplexer 414 exists after the channel encoder 416. The "known data preamble" may also be injected at known intervals to aid in periodic resynchronization of the chaotic sequence generated in the transmitter $102_1$ and a base station 104 (described above in relation to FIG. 1) or receiver $154_1, \ldots, 154_N$ (described above in relation to FIG. 2). This would typically be the case for an implementation meant to operate in harsh channel conditions. Still, the invention is not limited in this regard.

Referring again to FIG. 4, the multiplexer 414 can be configured for selecting data symbols to be routed to the channel encoder 416 after a preamble period has expired. The multiplexer 414 can also be configured for communicating data symbols to the channel encoder 416. In this regard, it should be appreciated that a communication of the data symbols to the channel encoder 416 is delayed by a time defined by the length of the "known data preamble." This delay allows all of a "known data preamble" to be fully communicated to the channel encoder 416 prior to communication of the data symbols.

The channel encoder 416 can be configured for performing actions to represent the "known data preamble" and the data symbols in the form of a modulated amplitude-and-time-discrete digital signal. The modulated amplitude-and-time-discrete digital signal is defined by digital words which represent intermediate frequency (IF) modulated symbols comprised of bits of data having a one (1) value or a zero (0) value. Methods for representing digital symbols by an amplitude-and-time-discrete digital signal are well known to persons having ordinary skill in the art, and therefore will not be described herein. However, it should be appreciated that the channel encoder 416 can employ any known method for representing digital symbols by an amplitude-and-time-discrete digital signal.

As shown in FIG. 4, the channel encoder 416 can be selected as a digital baseband modulator employing quadrature phase shift keying (QPSK). As such, the output of the QPSK modulator includes an in-phase ("I") data and quadrature phase ("Q") data. Accordingly, the channel encoder 416 is configured for communicating I and Q data to the digital complex multiplier 424.

According an embodiment of the invention, the transmitter 102$_1$ is comprised of a sample rate matching device (not shown) between the channel encoder 416 and the complex multiplier 424. The sample rate matching device (not shown) can perform a sample rate increase on the amplitude-and-time-discrete digital signal so that a sample rate of the amplitude-and-time-discrete digital signal is the same as a digital chaotic sequence communicated to the digital complex multiplier 424. Still, the invention is not limited in this regard. For example, if the amplitude-and-time-discrete digital signal and the digital chaotic sequence are generated at the same rate, then the transmitter 102$_1$ can be absent of the sample rate matching device (not shown).

Referring again to FIG. 4, the digital complex multiplier 424 is configured for performing a complex multiplication in the digital domain. In the digital complex multiplier 424, the amplitude-and-time-discrete digital signal from the channel encoder 416 is multiplied by a chaotic spreading code $CSC_1$. The chaotic spreading code $CSC_1$ is a digital representation of a chaotic sequence. The chaotic sequence is generated in the chaos generator 418. The chaos generator 418 is generally configured for generating the chaotic sequence in accordance with the methods described below in relation to FIGS. 9-10. Accordingly, the chaos generator 418 employs polynomial equations, constants, and/or relatively prime numbers as moduli for use in a chaotic sequence generation. The rate at which the digital chaotic sequence is generated is an integer multiple of a data symbol rate. The greater the ratio between the data symbol period and the sample period of the digital chaotic sequence the higher a spreading gain. Notably, the chaos generator 418 can be configured for receiving initial conditions from the transmitter controller 410. The initial conditions define an arbitrary sequence starting location, i.e., the number of places that a chaotic sequence is to be cyclically shifted. The initial condition will be described below in relation to step 1014 of FIG. 10. The chaos generator 418 can also be configured for communicating the chaotic sequence to an RUQG 420.

The RUQG 420 is configured for statistically transforming a digital chaotic sequence into a transformed digital chaotic sequence with pre-determined statistical properties. The transformed digital chaotic sequence can have a characteristic form including real, complex, and/or quadrature. The transformed digital chaotic sequence can have different word widths and/or different statistical distributions. For example, the RUQG 420 may take in two (2) uniformly distributed real inputs from the chaos generator 418 and convert those via a complex-valued bivariate Gaussian transformation to a quadrature output having statistical characteristics of a Guassian distribution. Such conversions are well understood by those having ordinary skill in the art, and therefore will not be described herein. However, it should be understood that such techniques may use nonlinear processors, look-up tables, iterative processing (CORDIC functions), or other similar mathematical processes. The RUQG 420 is also configured for communicating transformed chaotic sequences to the SRMF 422.

According to an embodiment of the invention, the RUQG 420 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the following mathematical equations (1) and (2).

$$G_1 = \sqrt{-2\ln(u_1)} \cdot \cos(2\pi u_2) \quad (1)$$

$$G_1 = \sqrt{-2\ln(u_1)} \cdot \sin(2\pi u_2) \quad (2)$$

where $\{u_1, u_2\}$ are uniformly distributed independent input random variables and $\{G_1, G_2\}$ are Gaussian distributed output random variables. The invention is not limited in this regard.

Referring again to FIG. 4, SRMF 422 is configured to resample the transformed chaotic sequence so that the chaos sample rate of the transformed chaotic sequence matches a sample rate of the amplitude-and-time-discrete digital signal. The SRMF 422 is also configured to communicate a resampled, transformed digital chaotic sequence to the digital complex multiplier 424.

According to an embodiment of the invention, the SRMF 422 comprises at least one real sample rate matching filter. The sample rate matching filter is configured for resampling each of an in-phase processing path and a quadrature-phase processing path of the chaotic sequence. The real part of the sample rate matching filter is also configured for communicating an in-phase ("I") data to the digital complex multiplier 424. The imaginary part of the sample rate matching filter is also configured for communicating a quadrature phase ("Q") data to the digital complex multiplier 424. The invention is not limited in this regard.

Referring again to FIG. 4, the digital complex multiplier 424 is configured for performing complex-valued digital multiplication operations using the digital chaotic sequence output from the SRMF 422 and the amplitude-and-time-discrete digital signal output from the channel encoder 416. The result of the complex-valued digital multiplication operations is a digital representation of a coherent chaotic sequence spread spectrum modulated IF signal (hereinafter referred to as a "spread spectrum digital chaotic signal"). The spread spectrum digital chaotic signal comprises digital data that has been spread over a wide frequency bandwidth in accordance with a chaotic sequence generated by the chaos generator 418. The digital complex multiplier 424 is also configured to communicate spread spectrum digital chaotic signals to the interpolator 426.

The interpolator 426, real part of complex multiplier 428, and quadrature digital local oscillator 430 form at least one intermediate frequency (IF) translator. IF translators are well known to persons having ordinary skill in the art, and therefore will not be described herein. However, it should be understood that components 426, 428, 430 can be collectively configured for frequency modulating a spread spectrum digital chaotic signal received from the complex multiplier 424 to a sampled digital chaotic signal at a second IF. The IF translator (i.e., components 426, 428, 430) is configured for communicating the sampled digital chaotic signal to the DAC 432, wherein the sampled digital chaotic signal has an increased sampling rate and a non-zero intermediate frequency. The DAC 432 can be configured for converting the sampled digital chaotic signal to an analog signal. The DAC 432 can also be configured for communicating the analog signal to the anti-image filter 434.

According to an embodiment of the invention, the complex multiplier 424 is configured for multiplying I and Q data of an amplitude-and-time-discrete digital signal by I and Q data of a digital chaotic sequence to obtain a digital chaotic signal. The digital chaotic signal is a quadrature, zero IF signal. The complex multiplier 424 is also configured for communicating the quadrature, zero IF signal to an IF translator. The interpolator 426 is comprised of dual real interpolators configured for changing a sample rate of the quadrature, zero IF signal to a predetermined rate commensurate with the predetermined second IF (e.g., two hundred eighty mega samples per second for a seventy mega Hertz IF). The interpolator 426 communicates the sampled, quadrature, zero IF signal to a multiplier 428 which performs the real half of a complex multiplication (e.g., takes the real part of a complex multiplication as its output). The multiplier 428 multiplies the interpolated spread spectrum signal by the quadrature sinusoid generated by the digital location oscillator 430 to modulate the center frequency of the spread signal by the frequency of quadrature sinusoid to a second IF. The real output of the multiplier is input to the DAC 432. Embodiments of the present invention are not limited in this regard.

According to another embodiment of the present invention, the DAC 432 is an interpolating DAC that partially or completely performs functions 426, 428, 430 internally (e.g., increases the sampling rate to two hundred eighty mega samples per second and the IF to seventy mega Hertz). In this embodiment of the present invention, the input to the interpolating DAC is either the output of the complex multiplier 424, the interpolator, or the multiplier. If the input to the interpolating DAC is the output of the complex multiplier 424, then the output of the complex multiplier is a zero IF sampled at seventy mega samples per second. The interpolating DAC interpolates by a factor of four and performs an fs/4 up conversion to seventy mega Hertz at a two hundred eighty mega samples per second sample rate. If the input to the interpolating DAC is the output of the interpolator 426, then the output of the interpolator is a zero IF sampled at sixty mega samples per second. The interpolating DAC interpolates by a factor of four and performs an fs/4 up conversion to sixty mega Hertz at a two hundred forty mega samples per second sampling rate. If the input to the interpolating DAC is the output of the multiplier, then the output of the multiplier is a ten mega Hertz IF at sixty mega samples per second. The interpolating DAC interpolates by a factor of four and performs an fs/4 up conversion to seventy mega Hertz at a two hundred forty mega samples per second sampling rate. Interpolating DACs are well known to those having ordinary skill in the art, and therefore will not be described herein. Embodiments of the present invention are not limited in this regard.

Referring again to FIG. 4, the anti-image filter 434 is configured for removing spectral images from the analog signal to form a smooth time domain signal. The anti-image filter 434 is also configured for communicating a smooth time domain signal to the RF conversion device 436. The RF conversion device 436 can be a wide bandwidth analog IF-to-RF up converter. The RF conversion device 436 is also configured for forming an RF signal by centering a smooth time domain signal at an RF for transmission. The RF conversion device 436 is further configured for communicating RF signals to a power amplifier (not shown). The power amplifier (not shown) is configured for amplifying a received RF signal. The power amplifier (not shown) is also configured for communicating amplified RF signals to an antenna element 438 for communication to a base station 104 (described above in relation to FIG. 1) and/or a receiver 154$_1$, . . . , 154$_N$ (described above in relation to FIG. 2).

It should be understood that the digital generation of the digital chaotic sequence at the transmitter 102$_1$ and receiver (e.g., the base station 104 described above in relation to FIG. 1 or the receiver 154$_1$, . . . , 154$_N$ described above in relation to FIG. 2) is kept closely coordinated under the control of a precision real time reference 412 clock. If the precision of the clock 412 is relatively high, then the synchronization of the chaos generator 418 of the transmitter 102$_1$ and the chaos generator (described below in relation to FIG. 6 and FIG. 8) of the receiver (e.g., the base station 104 described above in relation to FIG. 1 or the receiver 154$_1$, . . . , 154$_N$ described above in relation to FIG. 2) is relatively close. The precision real time reference 412 allows the states of the chaos generators to be easily controlled and coordinated with precision.

According to an embodiment of the invention, the precision real time reference 412 is a stable local oscillator locked to a precision real time reference (e.g., a global positioning system clock receiver or a chip scale atomic clock). The precision real time reference 412 is configured to supply a high frequency clock to the clocked logic circuits 404, . . . , 432 while being locked to a lower frequency reference clock. The lower frequency reference clock supplies a common reference and a common real time of day reference to prevent a large drift between the states of the chaos generator 418 and the chaos generator (described below in relation to FIG. 6 and FIG. 8) of the receiver (e.g., the base station 104 described above in relation to FIG. 1 or the receiver 154$_1$, . . . , 154$_N$ described above in relation to FIG. 2) over an extended time interval. The invention is not limited in this regard.

RF Front End and Receiver Back End Architectures

Figure 5:
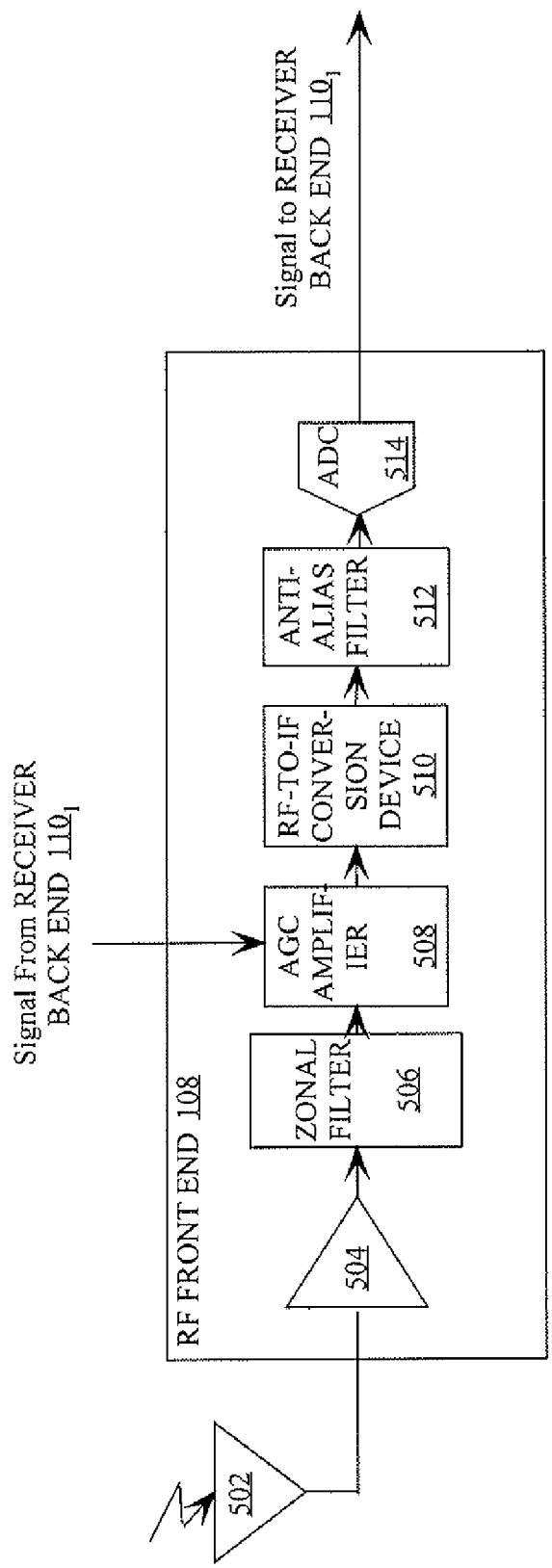
FIG. 5 is a block diagram of the radio frequency (RF) front end of FIGS. 1-2 according to an embodiment of the invention.

Referring now to FIG. 5, there is provided a more detailed block diagram of the RF front end 108 of FIG. 1. A more detailed block diagram of the receiver back end 110$_1$ of FIG. 1 is provided in FIG. 6. Notably, the RF front ends 108$_1$, . . . , 108$_N$ of FIG. 2 are the same as or substantially similar to the RF front end 108. As such the description provided below is sufficient for understanding the RF front ends 108$_1$, . . . , 108$_N$ of FIG. 2. Similarly, the receiver back ends 110$_2$, . . . , 110$_N$ of FIGS. 1 and 2 are the same as or substantially similar to the receiver back end 110$_1$. As such, the description provided below in relation to the receiver back end 110$_1$ is sufficient for understanding the receiver back ends 110$_2$, . . . , 110$_N$.

Referring now to FIG. 5, the RF front end 108 is generally configured for receiving transmitted analog chaotic signals from a transmitter 102$_1$, . . . , 102$_N$ (described above in relation to FIGS. 1-2 and FIG. 4). The RF front end 108 is also generally configured for down converting and digitizing a received analog chaotic signal. Accordingly, the RF front end 108 comprises an antenna element 502, a low noise amplifier (LNA) 504, a zonal filter 506, an automatic gain control (AGC) amplifier 508, a radio frequency (RF) to intermediate frequency (IF) conversion device 510, an anti-alias filter 512, and an analog-to-digital (A/D) converter 514.

Antenna element 502 is generally configured for receiving an analog input signal communicated from transmitter 102$_1$ over a communications link. Antenna element 502 can also be configured for communicating the analog input signal to LNA 504. LNA 504 is generally configured for amplifying a received analog input signal while adding as little noise and distortion as possible. LNA 504 can also be configured for communicating an amplified, analog input signal to zonal filer 506. Zonal filter 506 is configured for suppressing large interfering signals outside of bands of interest. Zonal filter 506 is also configured for communicating filtered, analog input signals to the AGC amplifier 508. AGC amplifier 508 is generally a controllable gain amplifier configured for adjusting a gain of an analog input signal. AGC amplifier 508 is configured for communicating gain adjusted, analog input signals to the RF-to-IF conversion device 536.

The RF-to-IF conversion device 536 is generally configured for mixing an analog input signal to a particular IF. The RF-to-IF conversion device 536 is also configured for communicating mixed analog input signals to the anti-alias filter 512. Anti-alias filter 512 is configured for restricting a bandwidth of a mixed analog input signal. Anti-alias filter 512 is also configured for communicating filtered, analog input signals to the A/D converter 514. A/D converter 514 is configured for converting received analog input signals to digital signals. A/D converter 514 is also configured for communicating digital input signals to one or more receiver back ends (e.g., the receiver back ends $110_1, \ldots, 110_N$).

Figure 6:
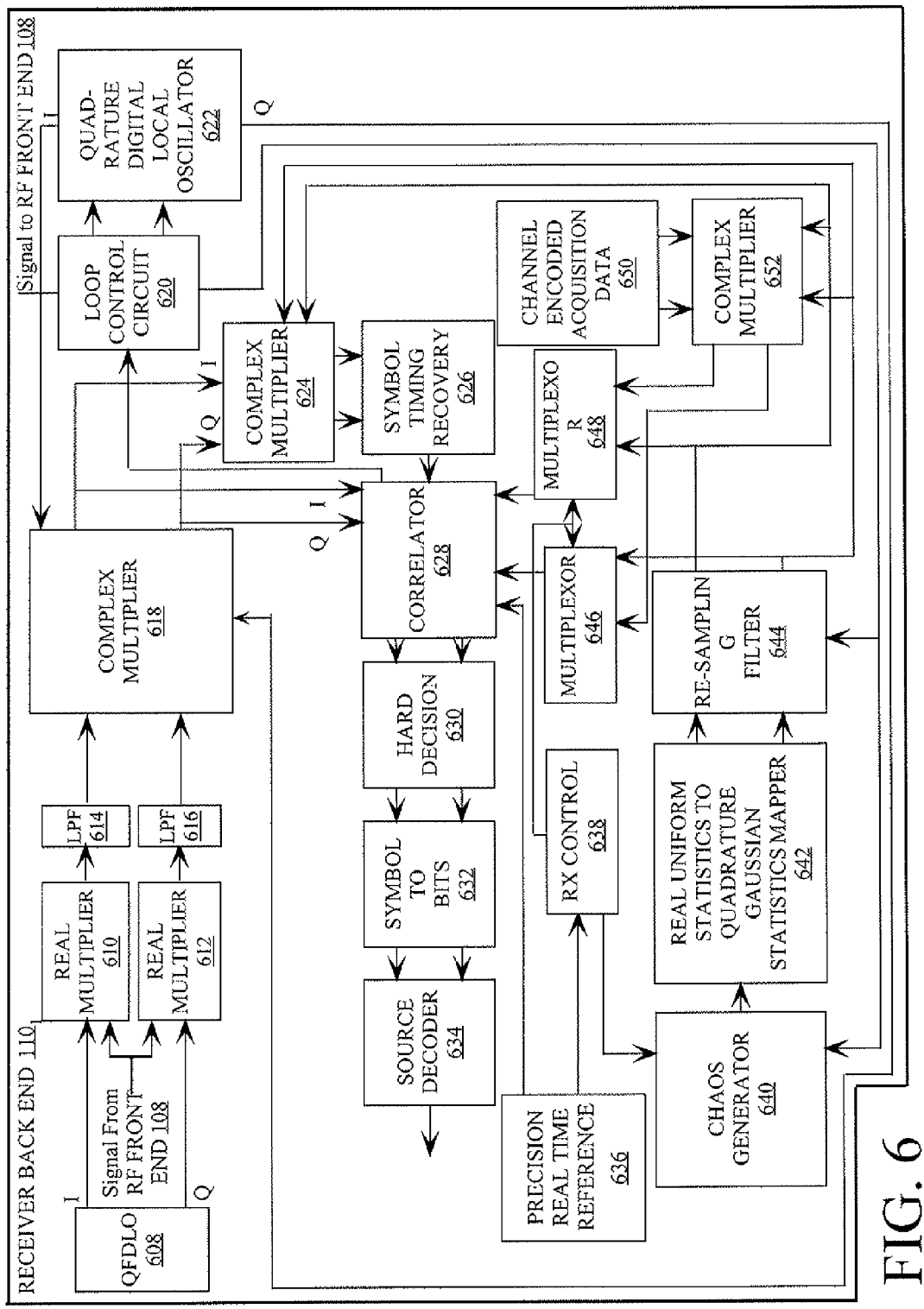
FIG. 6 is a block diagram of the receiver back end of FIGS. 1-2 according to an embodiment of the invention.

Referring now to FIG. 6, the receiver back end $110_1$ is generally configured for de-spreading a transmitted analog chaotic signal by correlating it with a replica of the chaotic sequence generated at a transmitter $102_1, \ldots, 102_N$. Notably, the replica chaotic sequence is time synchronized to the transmitted analog chaotic signal, i.e., a sampling rate of the replica chaotic sequence is the same as a sampling rate of the transmitted analog chaotic signal and is synchronized with a clock (not shown) of the transmitter $102_1, \ldots, 102_N$. The receiver back end $110_1$ is further configured for processing de-spreaded analog chaotic signals to obtain data contained therein. The data can be converted into text, sound, pictures, navigational-position information, and/or any other type of useful payload information that can be communicated.

Notably, the receiver back end $110_1$ of FIG. 6 is designed to eliminate the drawbacks of conventional analog based coherent communications systems. In this regard, it should be understood that analog chaos circuits of conventional analog based coherent communications systems are synchronized by periodically exchanging state information. The exchange of state information requires a substantial amount of additional bandwidth. In contrast, the receiver back end $110_1$ is configured to synchronize two (2) strings of discrete time chaotic samples (i.e., chaotic sequences) without using a constant or periodic transfer of state update information. This synchronization feature of the receiver back end $110_1$ will become more apparent as the discussion progresses.

As shown in FIG. 6, the receiver back end $110_1$ comprises a Quadrature Fixed Digital Local Oscillator (QFDLO) 608, real multipliers 610, 612, low pass filters (LPFs) 614, 616, a complex multiplier 618, a loop control circuit 620, a quadrature digital local oscillator 622, a correlator 628, multiplexers 646, 648, a channel encoded acquisition data generator (CEADG) 650, complex multipliers 624, 652, and a symbol timing recovery circuit 626. The receiver back end $110_1$ also comprises a receiver controller 638, a precision real time reference clock 636, a hard decision device 630, a symbol to bits (S/B) converter 632, and a source decoder 634. The receiver back end $110_1$ further comprises a chaos generator 640, a real uniform statistic to quadrature Gaussian statistic mapper (RUQG) 642, and a re-sampling filter 644.

The QFDLO 608, real multipliers 610, 612, and LPFs 614, 616 combine to form a digital Weaver modulator. The digital Weaver modulator forms a baseband quadrature signal from the real IF signal generated by the RF front end 108. The quadrature digital local oscillator 622 is generally configured for generating a complex quadrature amplitude-and-time-discrete digital sinusoid at selectable phases and frequencies to fine tune the baseband quadrature signal. The digital sinusoid can be generated using a binary phase control word and a binary frequency control word received from the loop control circuit 620. The quadrature digital local oscillator 622 is also configured for communicating digital words representing the quadrature digital sinusoid to the complex multiplier 618.

The complex multiplier 618 is configured for receiving digital words from the LPFs 614, 616 and digital words from the digital local oscillator 622. The complex multiplier 618 is also configured for generating digital output words by multiplying digital words from the LPFs 614, 616 by digital words from the quadrature digital local oscillator 622. The multiplier 618 is further configured for communicating data represented as digital output words to the complex multiplier 624 and the correlator 628.

The complex multiplier 624 is configured for performing a complex multiplication in the digital domain. The complex multiplication can involve multiplying digital words received from the complex multiplier 618 by digital words representing a chaotic sequence. The chaotic sequence is generated in the chaos generator 640. The chaos generator 640 is generally configured for generating the chaotic sequence in accordance with the methods described below in relation to FIGS. 9-10. Accordingly, the chaos generator 640 employs polynomial equations, constants, and/or relatively prime numbers as moduli for use in a chaotic sequence generation.

The chaos generator 640 is also configured for communicating chaotic sequences to the RUQG 642. In this regard, it should be appreciated that the chaos generator 640 is coupled to the receiver controller 638. The receiver controller 638 is configured to control the chaos generator 640 so that the chaos generator 640 generates a chaotic sequence with the correct initial state when the receiver back end $110_1$ is in an acquisition mode and corrected states in a tracking mode.

The RUQG 642 can be configured for statistically transforming digital chaotic sequences into transformed digital chaotic sequences. Each of the transformed digital chaotic sequences can have a characteristic form. The characteristic form can include, but is not limited to, real, complex, quadrature, and combinations thereof. Each of the transformed digital chaotic sequences can have different word widths and/or different statistical distributions. The RUQG 642 can also be configured for communicating transformed chaotic sequences to the re-sampling filter 644.

According to the embodiment of the invention, the RUQG 642 is configured for statistically transforming a real uniform digital chaotic sequence into a quadrature Gaussian form of the digital chaotic sequence. The RUQG 642 is also configured for communicating the quadrature Gaussian form of the digital chaotic sequence to the re-sampling filter 644. More particularly, the RUQG 642 communicates an in-phase ("I") data and quadrature phase ("Q") data to the re-sampling filter 644. The invention is not limited in this regard.

Referring again to FIG. 6, the re-sampling filter 644 is configured for forwarding transformed chaotic sequences to the digital complex multiplier 624. The re-sampling filter 644 is also configured for making a chaos sample rate compatible with a received signal sample rate when the receiver back end $110_1$ is in acquisition mode. The re-sampling filter 644 is further configured to compensate for transmit and receive clock offsets with less than a certain level of distortion when the receiver back end $110_1$ is in a steady state demodulation mode. In this regard, it should be appreciated that the re-sampling filter 644 is configured for converting a sampling rate of in-phase ("I") and quadrature-phase ("Q") data sequences from a first sampling rate to a second sampling rate without changing the spectrum of the data contained in therein. The re-sampling filter 644 is configured to communicate in-phase ("I") and quadrature-phase ("Q") data sequences to the digital complex multipliers 624, 652 and the multiplexers 646, 648.

It should be noted that if a sampled form of a chaotic sequence is thought of as discrete samples of a continuous band limited chaos then the re-sampling filter 644 is effectively tracking the discrete time samples, computing a continuous representation of the chaotic sequence, and re-sampling the chaotic sequence at the discrete time points required to match the discrete time points sampled by the A/D converter 614. In effect, input values and output values of the re-sampling filter 644 are not exactly the same because the values are samples of the same waveform taken at slightly offset times. However, the values are samples of the same waveform so the values have the same power spectral density.

Referring again to FIG. 6, CEADG 650 is configured for generating modulated acquisition sequences. CEADG 650 is also configured for communicating modulated acquisition sequences to the complex multiplier 652. The complex multiplier 652 is configured for performing complex multiplication in the digital domain to yield a reference for a digital input signal. This complex multiplication can involve multiplying a modulated acquisition sequence received from the CEADG 650 by a digital representation of a chaotic sequence. The digital complex multiplier 652 is also configured for communicating reference signals to the multiplexers 646, 648.

Multiplexer 646 is configured for routing the quadrature-phase part of a reference signal to the correlator 628. Similarly, the multiplexer 648 is configured for routing the in-phase part of a reference signal to the correlator 628. In this regard, it should be appreciated that the multiplexers 646, 648 are coupled to the receiver controller 638. The receiver controller 638 is configured for controlling the multiplexers 646, 648 in tandem so that the multiplexers 646, 648 route the reference signal to the correlator 628 while the receiver back end $110_1$ is in an acquisition mode (described below).

Correlator 628 is configured for correlating a chaotic sequence with a digital input signal. In this regard, it should be understood that, the sense of the real and imaginary components of the correlation is directly related to the values of the real and imaginary components of the symbols of a digital input signal. It should also be understood that the sense of the real and imaginary components of the correlation can be directly related to the values of the real and imaginary components of the PSK symbols of a digital input signal. Thus when the correlator 628 is in a steady state demodulation mode, the output of the correlator 628 is PSK symbol soft decisions. The phrase "soft decisions", as used herein, refers to soft-values (which are represented by soft-decision bits) that comprise information about the bits contained in a sequence. Soft-values are values that represent the probability that a particular bit in a sequence is either a one (1) or a zero (0). For example, a soft-value for a particular bit can indicate that a probability of a bit being a one (1) is p(1)=0.3. Conversely, the same bit can have a probability of being a zero (0) which is p(0)=0.7.

Correlator 628 is also configured for communicating PSK soft decisions to the hard decision device 630 or source decoder 634 for final symbol decision making. The hard decision device 630 is configured for communicating symbol decisions to the S/B converter 632. S/B converter 632 is configured for converting symbols to a binary form. S/B converter 632 is also configured for communicating a binary data sequence to the source decoder 634. Source decoder 634 is configured for decoding FEC applied at a transmitter (e.g. the transmitter $102_1$ described above in relation to FIGS. 1-2 and FIG. 4). Source decoder 634 is also configured for passing decoded bit streams to one or more external devices (not shown) utilizing the decoded data.

Correlator 628 is generally configured for acquiring initial timing information associated with a chaotic sequence and initial timing associated with a data sequence. Correlator 628 is further configured for tracking phase and frequency offset information between a chaotic sequence and a digital input signal and for tracking input signal magnitude information between the chaotic sequence and the digital input signal. Methods for acquiring initial timing information are well known to persons having ordinary skill in the art, and therefore will not be described herein. Similarly, methods for tracking phase/frequency offset information are well known to persons having ordinary skill in the art, and therefore will not be described herein. However, it should be appreciated that any such method for acquiring initial timing information and/or for tracking phase/frequency offset information can be used without limitation.

Correlator 628 is configured for communicating magnitude and phase information as a function of time to the loop control circuit 620. Loop control circuit 620 is configured for using magnitude and phase information to calculate a deviation of an input signal magnitude from a nominal range and to calculate phase/frequency offset information. The calculated information can be used to synchronize a chaotic sequence with a digital input signal. Loop control circuit 620 is also configured for communicating phase/frequency offset information to the quadrature digital local oscillator 622 and for communicating gain deviation compensation information to the AGC amplifier 608. Loop control circuit 620 is further configured for communicating retiming control signals to the re-sampling filter 644 and the chaos generator 640.

Precision real time reference 636 is the same as or substantially similar to the precision real time reference 412 of FIG. 4. The description provided above in relation to the precision real time reference 412 is sufficient for understanding the precision real time reference 636 of FIG. 6.

The operation of the receiver back end $110_1$ will now be briefly described with regard to an acquisition mode and a steady state demodulation mode.

Acquisition Mode:

In acquisition mode, the re-sampling filter 644 performs a rational rate change and forwards a transformed chaotic sequence to the digital complex multiplier 652. The CEADG 650 generates a modulated acquisition sequence and forwards the same to the digital complex multiplier 652. The digital complex multiplier 652 performs a complex multiplication in the digital domain. In the digital complex multiplier 652, a modulated acquisition sequence from the CEADG 650 is multiplied by a digital representation of a chaotic sequence to yield a reference for a digital input signal that was generated at a transmitter (e.g., the transmitter $102_1$ described above in relation to FIGS. 1-2 and FIG. 4) to facilitate initial acquisition. The chaotic sequence is generated in the chaos generator 640. The digital complex multiplier 652 communicates a reference signal to the multiplexers 646, 648. The multiplexers 646, 648 route the reference signal to the correlator 628. The correlator 628 is transitioned into a search mode. In this search mode, the correlator 628 searches across an uncertainty window to locate a received signal state so that the chaos generator 640 can be set with the time synchronized state vector.

Steady State Demodulation Mode:

In steady state demodulation mode, the correlator 628 tracks the correlation between the received modulated signal and the locally generated chaos close to the nominal correlation peak to generate magnitude and phase information as a function of time. This information is passed to the loop control circuit 620. The loop control circuit 620 applies appropriate algorithmic processing to this information to extract phase offset, frequency offset, and magnitude compensation information. The correlator 628 also passes its output information, based on correlation times terminated by symbol boundaries, to the hard decision block 630.

The hard decision block 630 compares the correlation information to pre-determined thresholds to make hard symbol decisions. The loop control circuit 620 monitors the output of the correlator 628. When the loop control circuit 620 detects fixed correlation phase offsets, the phase control of the quadrature digital local oscillator 622 is modified to remove the phase offset. When the loop control circuit 620 detects phase offsets that change as a function of time, it adjusts the re-sampling filter 644 which acts as an incommensurate re-sampler when the receiver back end 110$_1$ is in steady state demodulation mode or the frequency control of the quadrature digital local oscillator 622 is modified to remove frequency or timing offsets.

When the correlator's 628 output indicates that the received digital input signal timing has "drifted" more than plus or minus a half ($\frac{1}{2}$) of a sample time relative to a locally generated chaotic sequence, the loop control circuit 620 (1) adjusts a correlation window in an appropriate temporal direction by one sample time, (2) advances or retards a state of the local chaos generator 640 by one iteration state, and (3) adjusts the re-sampling filter 644 to compensate for the time discontinuity. This loop control circuit 520 process keeps the chaos generator 418 of the transmitter (e.g., transmitter 102$_1$ described above in relation to FIG. 4) and the chaos generator 640 of the receiver back end 110$_1$ synchronized to within half ($\frac{1}{2}$) of a sample time.

If a more precise temporal synchronization is required to enhance performance, a re-sampling filter can be implemented as a member of the class of polyphase fractional time delay filters. This class of filters is well known to persons having ordinary skill in the art, and therefore will not be described herein.

As described above, a number of chaotic samples are combined with an information symbol at the transmitter (e.g., the transmitter 102$_1$). Since the transmitter (e.g., the transmitter 102$_1$) and receiver back end 110$_1$ timing are referenced to two (2) different precision real time reference clock 412, 636 oscillators, symbol timing must be recovered at the receiver back end 110$_1$ to facilitate robust demodulation. Symbol timing recovery can include (1) multiplying a received input signal by a complex conjugate of a locally generated chaotic sequence using the complex multiplier 624, (2) computing an N point running average of the product where N is a number of chaotic samples per symbol time, (3) storing the values, the maximum absolute values of the running averages, and the time of occurrence, and (4) statistically combining the values at the symbol timing recovery circuit 626 to recover symbol timing. It should be noted that symbol timing recovery can also be accomplished via an output of the correlator 628. However, additional correlator operations are needed in such a scenario. As should be appreciated, using a separate multiplier operation for this purpose adds additional capabilities to the receiver (e.g., the base station 104 of FIG. 1 and the receivers 154$_1$, . . . , 154$_N$ of FIG. 2). The additional capabilities include, but are not limited to, the capability to correlate and post process over multiple correlation windows simultaneously to locate the best statistical fit for symbol timing.

In this steady state demodulation mode, the symbol timing recovery circuit 626 communicates a symbol onset timing to the correlator 628 for controlling an initiation of a symbol correlation. Correlator 628 correlates a locally generated chaotic sequence with a received digital input signal during a symbol duration. The sense and magnitude of a real and imaginary components of the correlation are directly related to the values of the real and imaginary components of symbols of a digital input signal. Accordingly, correlator 628 generates symbol soft decisions. Correlator 628 communicates the symbol soft decisions to the hard decision device 630 for final symbol decision making. Hard decision device 630 determines symbols using the symbol soft decisions. Thereafter, hard decision device 630 communicates the symbols to the S/B converter 632. S/B converter 632 converts the symbol decisions to a binary form. S/B converter 632 communicates a binary data sequence to the source decoder 634. Source decoder 634 decodes the FEC applied at the transmitter (e.g., the transmitter 102$_1$ described above in relation to FIGS. 1-2 and FIG. 4). Source decoder 634 also passes the decoded bit stream to one or more external devices (not shown) utilizing the decoded data.

Figure 7:
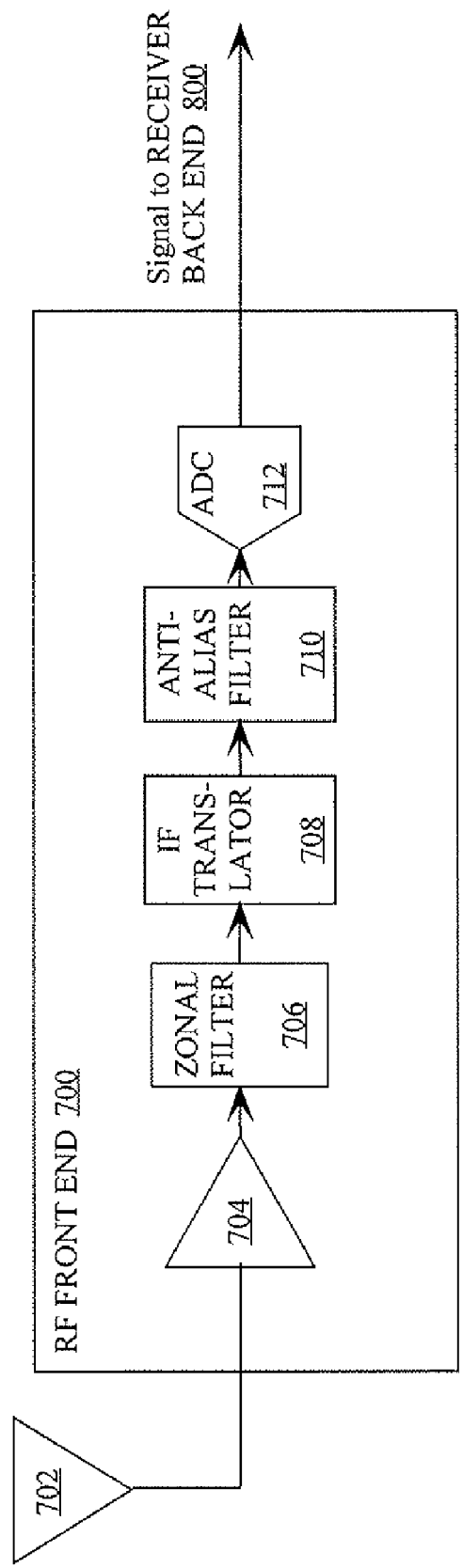
FIG. 7 is a block diagram of an exemplary radio frequency (RF) front end according to an embodiment of the invention.

Referring now to FIG. 7, there is provided a block diagram of another exemplary embodiment of an RF front end. Another exemplarily embodiment of a receiver back end is provided in FIG. 8. As shown in FIG. 7, the RF front end 700 is comprised of a plurality of components 702, 704, 706, 708, 710, 712. The components 702, 704, 706, 710, 712 of the RF front end 700 of FIG. 7 are the same as or substantially similar to the respective components 502, 504, 506, 512, 514 of FIG. 5. As such, the description provided above in relation to the components 502, 504, 506, 512, 514 is sufficient for understanding the components 702, 704, 706, 710, 712 of the RF front end 700. Component 708 of the RF front end 700 is an IF translator. IF translators are well known to those having ordinary skill in the art, and therefore will not be described herein.

Figure 8:
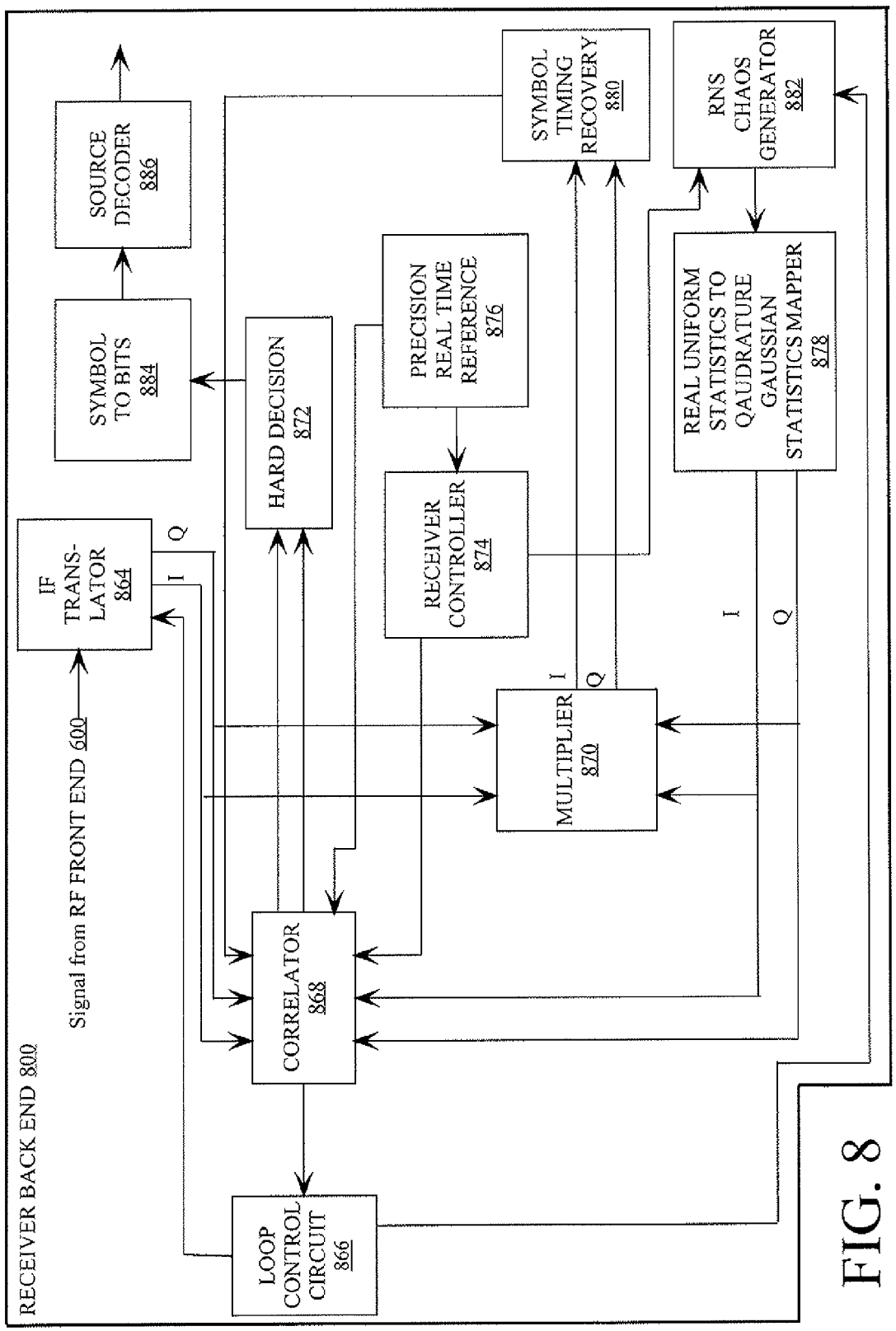
FIG. 8 is a block diagram of an exemplary receiver back end according to an embodiment of the invention.

As shown in FIG. 8, the receiver back end 800 is comprised of a loop control circuit 866, a correlator 868, and a digital complex multiplier 870. The receiver back end 800 is also comprised of a receiver controller 874, a precision real time reference 876, a hard decision device 872, a symbol to bits (S/B) converter 884, and a source decoder 886. The receiver back end 800 is further comprised of a residue number system (RNS) chaos generator 882 and a real uniform statistics to quadrature Gaussian statistics mapper 878. Each of the above listed components 854-886, 892 are similar to the respective components 602-606, 612, 614, 620, 628-642, 652 of FIG. 6. Thus, the description provided above in relation to components 602-606, 612, 614, 620, 628-642, 652 is sufficient for understanding the components 854-886, 892 of the receiver back end 800.

Chaos Generators and Digital Chaotic Sequence Generation

Figure 9:
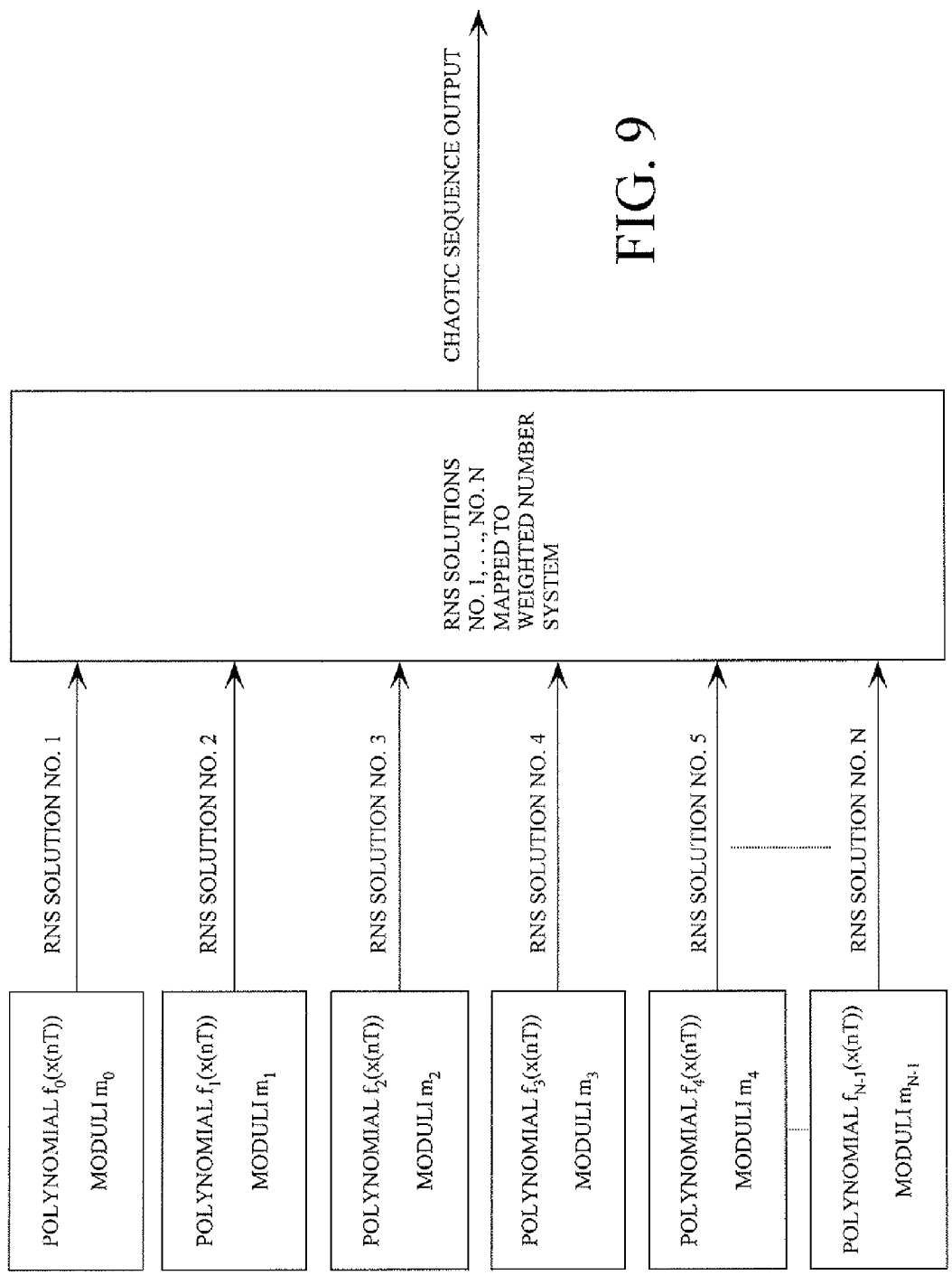
FIG. 9 is a conceptual diagram of the chaos generators of FIGS. 4, 6, and 8.

Referring now to FIG. 9, there is provided a conceptual diagram of a chaos generator 418, 640, 882 (described above in relation to FIG. 4, FIG. 6, and FIG. 8). As shown in FIG. 9, generation of the chaotic sequence begins with polynomial equations $f_0(x(nT))$, . . . , $f_{N-1}(x(nT))$. The polynomial equations $f_0(x(nT))$, . . . , $f_{N-1}(x(nT))$ can be selected as the same polynomial equation or as different polynomial equations. According to an aspect of the invention, the polynomial equations $f_0(x(nT))$, . . . , $f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation", as used herein, refers to a polynomial equation that cannot be expressed as a product of at least two nontrivial polynomial equations over the same Galois field (f). For example, the polynomial equation f(x(nT)) is irreducible if there does not exist two (2) non-constant polynomial equations g(x(nT)) and h(x(nT)) in x(nT) with rational coefficients such that f(x(nT))=g(x(nT))·h(x(nT)).

Each of the polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to persons having ordinary skill in the art, and therefore will not be described herein. However, it should be appreciated that a RNS residue representation for some weighted value "a" can be defined by following mathematical equation (3).

$$R=\{a \text{ modulo } m_0, a \text{ modulo } m_1, \ldots, a \text{ modulo } m_{N-1}\} \quad (3)$$

where R is a RNS residue N-tuple value representing a weighted value "a" and $m_0, m_1, \ldots, m_{N-1}$ respectively are the moduli for RNS arithmetic operations applicable to each polynomial equation $f_0(x(nT)), \ldots, f_{N-1}(x(nT))$. R(nT) can be a representation of the RNS solution of a polynomial equation f(x(nT)) defined as R(nT)={$f_0(x(nT))$ modulo $m_0$, $f_0(x(nT))$ modulo $m_1, \ldots, f_{N-1}(x(nT))$ modulo $m_{N-1}$}.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers", as used herein, refers to a collection of natural numbers having no common divisors except one (1). Consequently, each RNS arithmetic operation employed for expressing a solution as an RNS residue value uses a different relatively prime number $p_0, p_1, \ldots, p_{N-1}$ as a moduli $m_0, m_1, \ldots, m_{N-1}$.

The RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the polynomial equations $f_0(x(nT)), \ldots, f_{N-1}(x(nT))$ is selected as an irreducible cubic polynomial equation having chaotic properties in Galois field arithmetic. Each of the polynomial equations $f_0(x(nT)), \ldots, f_{N-1}(x(nT))$ can also be selected to be a constant or varying function of time. The irreducible cubic polynomial equation is defined by the following mathematical equation (4).

$$f(x(nT))=Q(k)x^3(nT)+R(k)x^2(nT)+S(k)x(nT)+C(k,L) \quad (4)$$

where:
x is a variable defining a sequence location;
n is a sample time index value;
k is a polynomial time index value;
L is a constant component time index value;
T is a fixed constant having a value representing a time interval or increment;
Q, R, and S are coefficients that define the polynomial equation f(x(nT)); and
C is a coefficient of x(nT) raised to a zero power and is therefore a constant for each polynomial characteristic.

In a preferred embodiment, a value of C is selected which empirically is determined to produce an irreducible form of the stated polynomial equation f(x(nT)) for a particular prime modulus. For a given polynomial with fixed values for Q, R, and S more than one value of C can exist, each providing a unique iterative sequence. Still, the invention is not limited in this regard.

According to another embodiment of the invention, the polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation f(x(nT)). Such constant values $C_0, C_1, \ldots, C_{N-1}$ and associated modulus $m_0, m_1, \ldots, m_{N-1}$ values which produce an irreducible form of the stated polynomial equation f(x(nT)) are listed in the following Table (1).

TABLE 1

| Moduli values $m_0, m_1, \ldots, m_{N-1}$: | Sets of constant values $C_0, C_1, \ldots, C_{N-1}$: |
| --- | --- |
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 9 will depend on the quantity of polynomial equations N and the modulus values $m_0, m_1, \ldots, m_{N-1}$ values selected for the RNS number systems. In particular, this value can be calculated as the product $M = m_0 \cdot m_1 \cdot m_3 \cdot m_4 \cdot \ldots \cdot m_{N-1}$.

Referring again to FIG. 9, it should be appreciated that each of the RNS solutions No. 1, . . . , No. N is expressed in a binary number system representation. As such, each of the RNS solutions No. 1, . . . , No. N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by the following mathematical equation (5).

$$BL = \text{Ceiling}[\text{Log } 2(m)] \quad (5)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_0(nT)$ are in the range of zero (0) and four hundred ninety (490) which can be represented in nine (9) binary digits. Possible solutions for $f_0(x(nT))$ are in the range of zero (0) and four hundred seventy eight (478) which can be represented in nine (9) binary digits. Possible solutions for $f_0(x(nT))$ are in the range of zero (0) and four hundred sixty six (466) which can be represented in nine (9) binary digits. Possible solutions for $f_0(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of every M times T seconds, i.e., a sequence repetition times an interval of time between exact replication of a sequence of generated values. Still, the invention is not limited in this regard.

Referring again to FIG. 9, the RNS solutions No. 1, . . . , No. N are mapped to a weighted number system representation thereby forming a chaotic sequence output. The phrase "weighted number system", as used herein, refers to a number system other than a residue number system. Such weighted number systems include, but are not limited to, an integer number system, a binary number system, an octal number system, and a hexadecimal number system.

According to an aspect of the invention, the RNS solutions No. 1, . . . , No. N are mapped to a weighted number system representation by determining a series of digits in the weighted number system based on the RNS solutions No. 1, . . . , No. N. The term "digit", as used herein, refers to a symbol of a combination of symbols to represent a number. For example, a digit can be a particular bit of a binary sequence. According to another aspect of the invention, the RNS solutions No. 1, . . . , No. N are mapped to a weighted number system representation by identifying a number in the weighted number system that is defined by the RNS solutions No. 1, . . . , No. N. According to yet another aspect of the invention, the RNS solutions No. 1, . . . , No. N are mapped to a weighted number system representation by identifying a truncated portion of a number in the weighted number system that is defined by the RNS solutions No. 1, . . . , No. N. The truncated portion can include any serially arranged set of digits of the number in the weighted number system. The truncated portion can also be exclusive of a most significant digit of the number in the weighted number system. The truncated portion can be a chaotic sequence with one or more digits removed from its beginning and/or ending. The truncated portion can also be a segment including a defined number of digits extracted from a chaotic sequence. The truncated portion can further be a result of a partial mapping of the RNS solutions No. 1, . . . , No. N to a weighted number system representation.

According to an embodiment of the invention, a mixed-radix conversion method is used for mapping RNS solutions No. 1, . . . , No. N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1.\text{" See Id.}$$

For conversion from the RNS to a mixed-radix system, a set of moduli are chosen so that $m_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_i$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x - a_1$ in its residue code. The quantity $x - a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1}, a_2 = \left\langle \left\lfloor \frac{x}{m_1} \right\rfloor \right\rangle_{m_2}, a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i}."$$

See Id. From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions No. 1, . . . , No. N to a weighted number system representation. The CRT arithmetic operation can be defined by a mathematical equation (6) [returning to zero (0) based indexing].

$$Y(nT) = \left\{ \begin{array}{l} \left[ \langle (3x_0^3(nT) + 3x_0^2(nT) + x_0(nT) + C_0)b_0 \rangle_{p_0} \right] \frac{M}{p_0} + \ldots + \\ \left[ \langle (3x_{N-1}^3(nT) + 3x_{N-1}^2(nT) + x_{N-1}(nT) + C_{N-1})b_{N-1} \rangle_{p_{N-1}} \right] \frac{M}{p_{N-1}} \end{array} \right\}_M \quad (6)$$

where Y(nT) is the result of the CRT arithmetic operation;
n is a sample time index value;
T is a fixed constant having a value representing a time interval or increment;
$x_0$-$x_{N-1}$ are RNS solutions No. 1, . . . , No. N;
$p_0, p_1, \ldots, p_{N-1}$ are prime numbers;
M is a fixed constant defined by a product of the relatively prime numbers $p_0, p_{N-1}$; and
$b_0, b_1, b_{N-1}$ are fixed constants that are chosen as the multiplicative inverses of the product of all other primes modulo $p_0, p_1, \ldots, p_{N-1}$, respectively.
Equivalently, $$b_j = \left( \frac{M}{p_j} \right)^{-1} \bmod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1. Thus for certain embodiments of the present invention, the $b_j$'s can be defined as $$b_j = \left( \frac{M}{p_j} \right)^{-1} \bmod p_j.$$

In other embodiments of the present invention, all $b_j$'s can be set equal to one or more non-zero values without loss of the chaotic properties resulting in mathematical equation (7).

$$Y(nT) = \left\{ \begin{array}{l} \left[ \langle 3x_0^3(nT) + 3x_0^2(nT) + x_0(nT) + C_0 \rangle_{p_0} \right] \frac{M}{p_0} + \ldots + \\ \left[ \langle 3x_{N-1}^3(nT) + 3x_{N-1}^2(nT) + x_{N-1}(nT) + C_{N-1} \rangle_{p_{N-1}} \right] \frac{M}{p_{N-1}} \end{array} \right\}_M \quad (7)$$

The invention is not limited in this regard.

Referring again to FIG. 9, the chaotic sequence output Y(nT) can be expressed in a binary number system representation. As such, the chaotic sequence output Y(nT) can be represented as a binary sequence. Each bit of the binary sequence has a zero (0) value or a one (1) value. The chaotic sequence output Y(nT) can have a maximum bit length (MBL) defined by the following mathematical equation (8).

$$MBL = \text{Ceiling}[\text{Log } 2(M)] \quad (8)$$

where M is the product of the relatively prime numbers $p_0, p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range", as used herein, refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059, 523). By substituting the value of M into Equation (8), the bit length (BL) for a chaotic sequence output Y expressed in a binary system representation can be calculated as follows: BL=Ceiling[Log 2(3,563,762,191,059,523)]=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059, 522), inclusive. Still, the invention is not limited in this regard. For example, chaotic sequence output Y can be a binary sequence representing a truncated portion of a value between zero (0) and M−1. In such a scenario, the chaotic sequence output Y can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (4) can be rewritten in a general iterative form: $f(x(nT)) = Q(k)x^3((n-1)T) + R(k)x^2((n-1)T) + S(k)x((n-1)T) + C(k,L)$. For example, a fixed coefficient polynomial equation is selected as $f(x(n\cdot 1 \text{ ms})) = 3x^3((n-1)\cdot 1 \text{ ms}) + 3x^2((n-1)\cdot 1 \text{ ms}) + x((n-1)\cdot 1 \text{ ms}) + 8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 10:
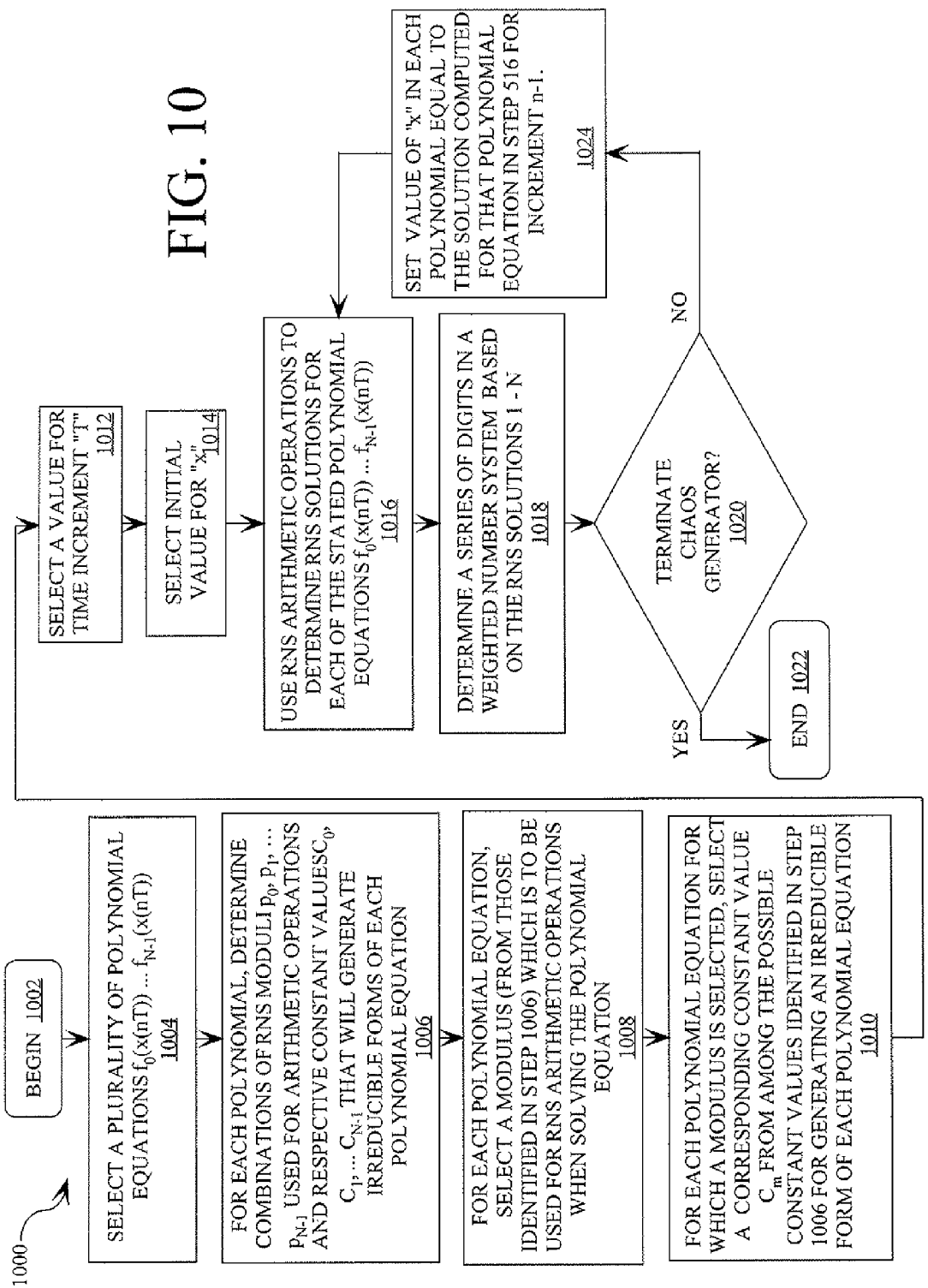
FIG. 10 is a flow diagram of a method for generating a chaotic spreading code (or chaotic sequence) according to an embodiment of the invention.

Referring now to FIG. 10, there is provided a flow diagram of a method 1000 for generating a chaotic sequence according to an embodiment of the invention. As shown in FIG. 10, method 1000 begins with step 1002 and continues with step 1004. In step 1004, a plurality of polynomial equations $f_0(x(nT)), \ldots, f_{N-1}(x(nT))$ are selected. The polynomial equations $f_0(x(nT)), \ldots, f_{N-1}(x(nT))$ can be selected as the same polynomial equation except for a different constant term or different polynomial equations. After step 1004, step 1006 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 1008, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. The modulus is selected from the moduli identified in step 1006. It should also be appreciated that a different modulus is advantageously selected for each polynomial equation $f_0(x(nT)), \ldots, f_{N-1}(x(nT))$.

As shown in FIG. 10, method 1000 continues with a step 1010. In step 1010, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 1006 for generating an irreducible form of the respective polynomial equation $f_0(x(nT)), \ldots, f_{N-1}(x(nT))$.

After step 1010, method 1000 continues with step 1012. In step 1012, a value for time increment "T" is selected. Thereafter, an initial value for the variable "x" of the polynomial equations is selected in step 1014. Notably, the initial value of the variable "x" defines a sequence starting location, i.e., the initial value of the variable "x" defines a static offset of a chaotic sequence Y(nT). It should be noted that a communication system including a plurality of transmitters can employ different initial values of the variable "x" to generate a plurality of orthogonal or statistically orthogonal chaotic spreading codes $CSC_1, \ldots, CSC_K$ with static offsets. As noted above in relation to FIG. 3B, orthogonal chaotic spreading codes with static offsets can generally be defined as $[y_{s-k1} y_{s-k1+1} \cdots y_{s-k1-2} y_{s-k1-1}]$, $[y_{s-k2+1} \cdots y_{s-k2-2} y_{s-k2-1}]$, and $[y_{s-kK} y_{s-kK+1} \cdots y_{s-kK-2} y_{s-kK-1}]$. The terms "k1", "k2", and "kN" represent the initial condition for a chaotic sequence starting location, i.e., each of the terms "k1", "k2", and "kN" represents a different initial value for the variable "x" of a respective polynomial equation. As shown in FIG. 3B, each of the orthogonal or statistically orthogonal chaotic spreading codes $CSC_1, \ldots, CSC_K$ has a static offset defined by the respective term "k1", "k2", and "kN".

Referring again to FIG. 10, method 1000 continues with step 1016. In step 1016, RNS arithmetic operations are used to iteratively determine RNS solutions for each of the stated polynomial equations $f_0(x(nT)), \ldots, f_{N-1}(x(nT))$. In step 1018, a series of digits in a weighted number system are determined based in the RNS solutions. Step 1018 can involve performing a mixed radix arithmetic operation or a CRT arithmetic operation using the RNS solutions to obtain a chaotic sequence output.

After step 1018, method 1000 continues with a decision step 1020. If a chaos generator is not terminated (1020:NO), then step 1024 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 1016. Subsequently, method 1000 returns to step 1016. If the chaos generator is terminated (1020:YES), then step 1022 is performed where method 1000 ends.

Figure 11:
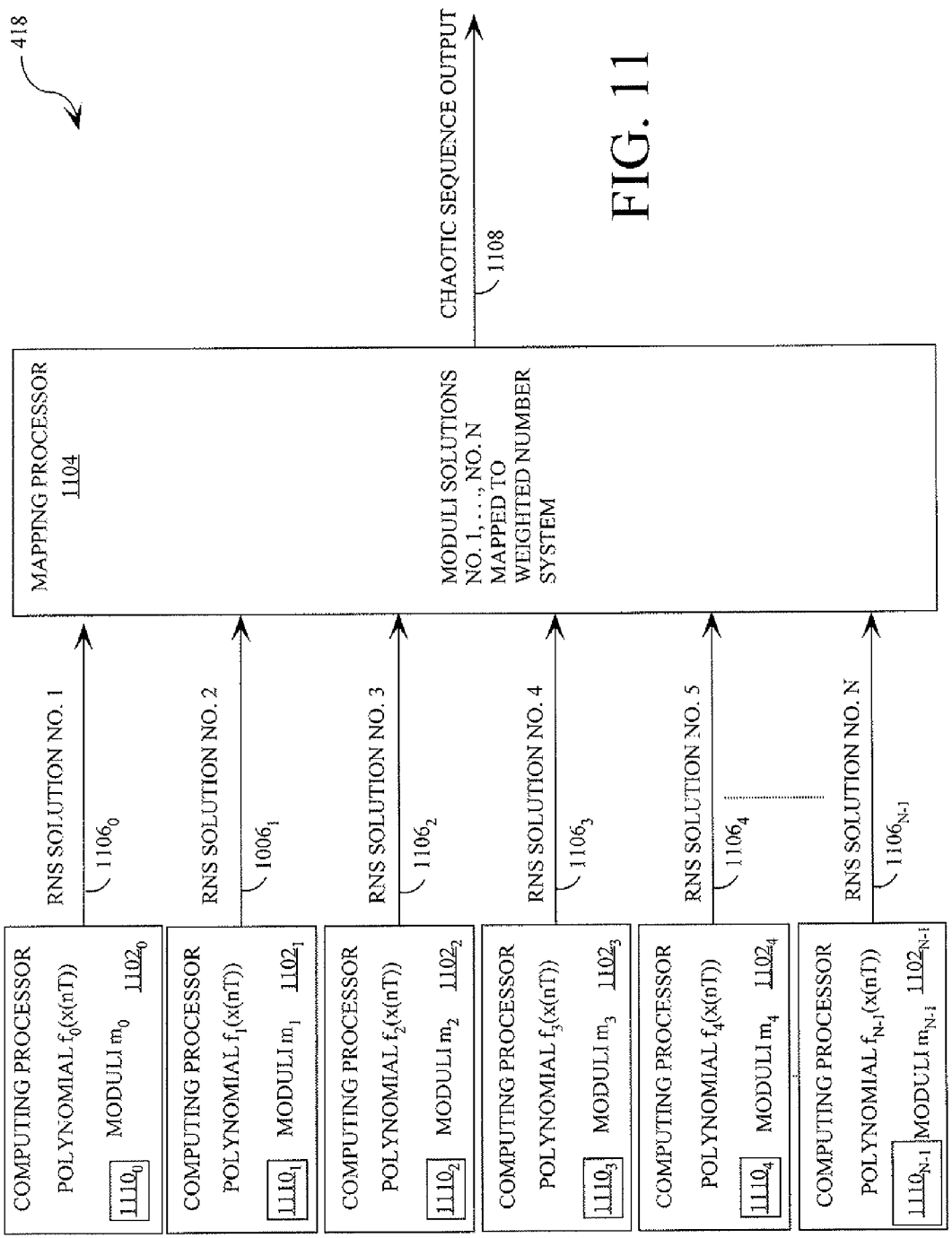
FIG. 11 is a block diagram of the chaos generator of FIG. 4 according to an embodiment of the invention.

Referring now to FIG. 11, there is illustrated one embodiment of chaos generator 418. Chaos generator 418 is generally comprised of hardware and/or software configured to generate a digital chaotic sequence. Accordingly, chaos generator 418 is comprised of computing processors $1102_0, \ldots, 1102_{N-1}$. Chaos generator 418 is also comprised of a mapping processor 1104. Each computing processor 1102$_0$, ..., 1102$_{N-1}$ is coupled to the mapping processor 1104 by a respective data bus 1106$_0$, ..., 1106$_{N-1}$. As such, each computing processor 1102$_0$, ..., 1102$_{N-1}$ is configured to communicate data to the mapping processor 1104 via a respective data bus 1106$_0$, ..., 1106$_{N-1}$. The mapping processor 1104 can be coupled to an external device (not shown) via a data bus 1108. The external device (not shown) includes, but is not limited to, a communications device configured to combine or modify a signal in accordance with a chaotic sequence output.

Referring again to FIG. 11, the computing processors 1102$_0$, ..., 1102$_{N-1}$ are comprised of hardware and/or software configured to solve the polynomial equations $f_0(x(nT)), \ldots, f_{N-1}(x(nT))$ to obtain a plurality of solutions. The polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The polynomial equations $f_0(x(nT)), \ldots, f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors 1102$_0$, ..., 1102$_{N-1}$ employ modulo operations to calculate a respective solution for each polynomial equation $f_0(x(nT)), \ldots, f_{N-1}(x(nT))$ using modulo based arithmetic operations. Each of the computing processors 1102$_0$, ..., 1102$_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors 1102$_0$, ..., 1102$_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors 1102$_0$, ..., 1102$_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism 1110$_0$, ..., 1110$_{N-1}$ are chaotic. In this regard, it should be appreciated that the feedback mechanisms 1110$_0$, ..., 1110$_{N-1}$ are provided so that the solutions for each polynomial equation $f_0(x(nT)), \ldots, f_{N-1}(x(nT))$ can be iteratively computed. Accordingly, the feedback mechanisms 1110$_0$, ..., 1110$_{N-1}$ are comprised of hardware and/or software configured to selectively define a variable "x" of a polynomial equation as a solution computed in a previous iteration.

Referring again to FIG. 11, the computing processors 1102$_0$, ..., 1102$_{N-1}$ are further comprised of hardware and/or software configured to express each of the RNS residue values in a binary number system representation. In this regard, the computing processors 1102$_0$, ..., 1102$_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions No. 1, ..., No. N comprising the elements of an RNS N-tuple.

According to an embodiment of the invention, the computing processors 1102$_0$, ..., 1102$_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. On each iteration, the table address is used to initiate the sequence. Still, the invention is not limited in this regard.

Referring again to FIG. 11, the mapping processor 1104 is comprised of hardware and/or software configured to map the moduli (RNS N-tuple) solutions No. 1, ..., No. N to a weighted number system representation. The result is a series of digits in the weighted number system based on the moduli solutions No. 1, ..., No. N. For example, the mapping processor 1104 can be comprised of hardware and/or software configured to determine the series of digits in the weighted number system based on the RNS residue values using a Chinese Remainder Theorem process. In this regard, it will be appreciated by those skilled in the art that the mapping processor 1104 is comprised of hardware and/or software configured to identify a number in the weighted number system that is defined by the moduli solutions No. 1, ..., No. N.

According to an aspect of the invention, the mapping processor 1104 can be comprised of hardware and/or software configured to identify a truncated portion of a number in the weighted number system that is defined by the moduli solutions No. 1, ..., No. N. For example, the mapping processor 1104 can also be comprised of hardware and/or software configured to select the truncated portion to include any serially arranged set of digits of the number in the weighted number system. Further, the mapping processor 1104 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 11, the mapping processor 1104 is comprised of hardware and/or software configured to express a chaotic sequence in a binary number system representation. In this regard, it should be appreciated that the mapping processor 1104 can employ a weighted-to-binary conversion method. Weighted-to-binary conversion methods are generally known to persons having ordinary skill in the art, and therefore will not be described herein. However, it should be appreciated that any such weighted-to-binary conversion method can be used without limitation.

It should be noted that the transmitters 102$_1$, ..., 102$_N$ are configured to generate the same chaotic sequence using the chaotic sequence generation method described above in relation to FIGS. 9-10. However, each of the transmitters 102$_1$, ..., 102$_N$ can be provided with a different initial value for the variable "x". As such, the transmitters 102$_1$, ..., 102$_N$ can generate that same chaotic sequence with different static offsets. The chaotic sequences generated at the transmitters 102$_1$, ..., 102$_N$ provide orthogonal chaotic spreading codes for spreading signals over a large common frequency band. The spread spectrum signals can be transmitted from the transmitters to the base station 104 (described above in relation to FIG. 1) or receivers 154$_1$, ..., 154$_N$ (described above in relation to FIG. 2). At the receivers, the appropriate orthogonal spreading codes are used to recover the original signals intended for a particular user. Accordingly, the receivers 154$_1$, ..., 154$_N$ are configured to generate replicas of the orthogonal chaotic spreading codes using the chaotic sequence generation method described above in relation to FIGS. 9-10.

Figure 12:
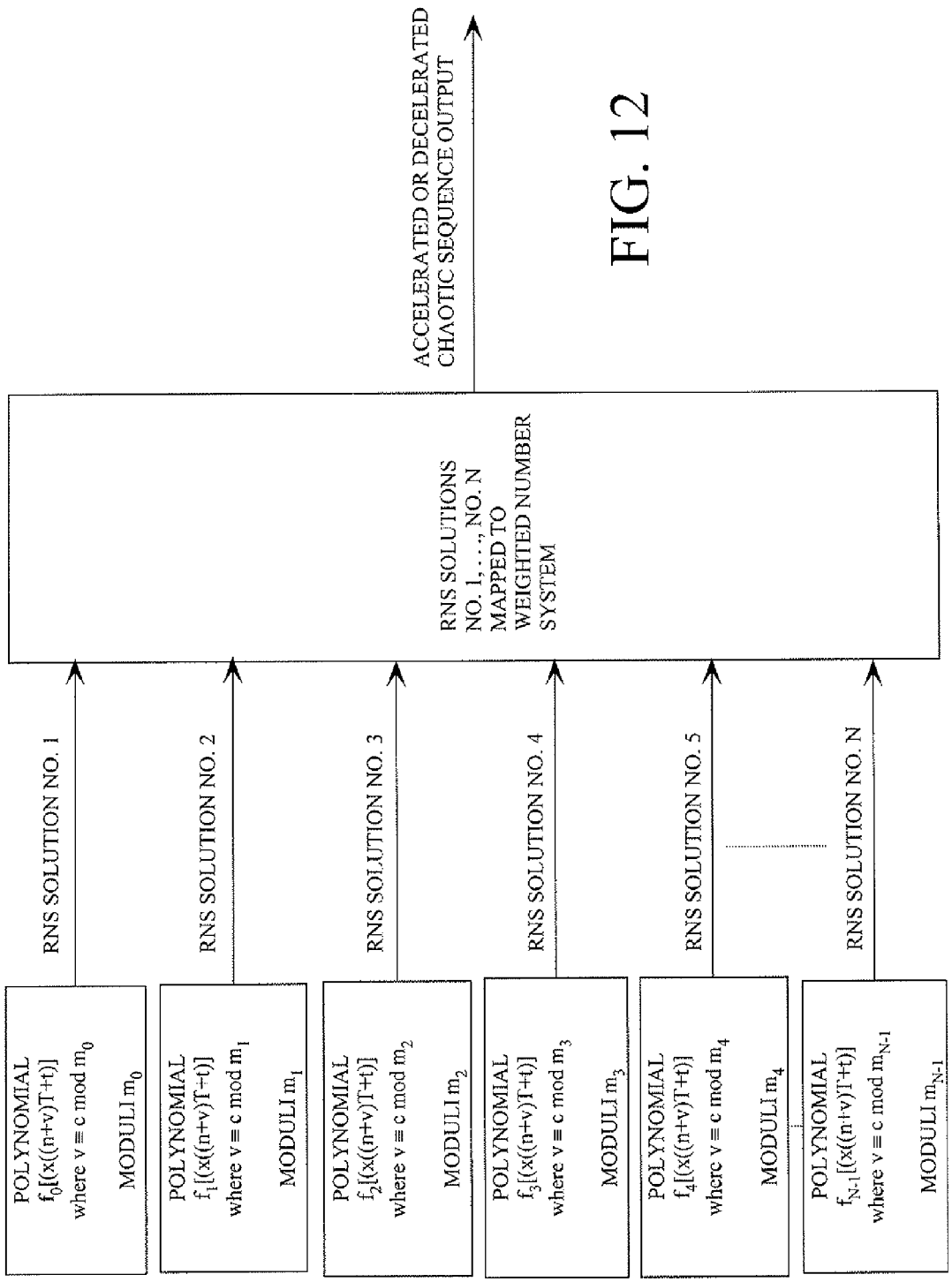
FIG. 12 is a conceptual diagram of a chaos generator according to an embodiment of the invention.

It should also be noted that the present invention is not limited to the chaotic sequence generation methods 900, 1000 described above in relation to FIGS. 9 and 10. For example, the present invention can additionally or alternatively employ chaos generators implementing methods as described below in relation to FIG. 12. FIG. 12 provides a conceptual diagram of chaos generators according to another embodiment of the invention.

Referring now to FIG. 12, generation of the chaotic sequence begins with "N" polynomial equations. The polynomial equations can be selected as polynomial equations $f_0[x((n+v)T+t)], \ldots, f_{N-1}[x((n+v)T+t)]$. n is an index of time used to define the initial state of the polynomial. v (also referred to as "acc-dec variable") is a variable having a value selected to accelerate or decelerate a chaotic sequence generation by at least one cycle. t is a variable representing time. T is a discrete time interval.

According to an embodiment of the invention, the acc-dec variable "v" is defined by the mathematical expression c modulo where i belongs to $\{0, 1, 2, \ldots, N-1\}$. c is a number of cycles for acceleration or deceleration. $m_i$ is a value indicating a cycle in which each of the individual RNS digital chaotic sequence components starts to repeat. It should be noted that such a modular reduction provides a chaotic sequence generation configured to instantaneously synchronize its cycle with a cycle of another chaotic sequence generation when all RNS components are simultaneously synchronized. This feature of the modular reduction will become more apparent as the discussion progresses. The invention is not limited in this regard.

Referring again to FIG. 12, the polynomial equations are selected for digitally generating an accelerated or decelerated chaotic sequence. In this regard, it should be appreciated that a chaotic sequence generation process using polynomial equations $f_0[x((n+v)T+t)], \ldots, f_{N-1}[x((n+v)T+t)]$ can be accelerated or decelerated by one cycle. To illustrate, we add a temporal index, k, from time n=0 to the polynomial equations to yield $f_{0,k}[x((n+v)T+t)], \ldots, f_{N-1,k}[x((n+v)T+t)]$. For example, if the acc-dec variable "v" is selected to have a value equal to zero (0) and the initial time t is set to zero (0), then a sequence of values $f_{0,0}[x((n)T)], f_{0,1}[x((n+1)T)], f_{0,2}[x((n+2)T)], f_{0,3}[x((n+3)T)], f_{0,4}[x((n+^4)T)], f_{N-1,0}[x((n)T)], f_{N-1,1}[x((n+1)T)], f_{N-1,2}[x((n+2)T)], f_{N-1,3}[x((n+3)T)], f_{N-1,4}[x((n+4)T)]$ are generated as a function of time during a chaotic sequence generation. Alternatively, if the acc-dec variable "v" is selected to have a value equal to positive one (+1) and the chaotic sequence generation is to be accelerated at time two (n=2) for a single cycle, then the sequence of values $f_{0,0}[x((n)T)], f_{0,1}[x((n+1)T)], f_{0,2}[x((n+3)T)], f_{0,3}[x((n+4)T)], f_{0,4}[x((n+5)T)], \ldots, f_{N-1,0}[x((n)T], f_{N-1,1}[X((n+1)T)], f_{N-1,2}[x((n+3)T], f_{N-1,3}[x((n+4)T)], f_{N-1,4}[x((n+5)T)]$ are generated as a function of time during a chaotic sequence generation. Similarly, if the acc-dec variable "v" is selected to have a value equal to negative one (−1) and the chaotic sequence generation is to be decelerated at time two (n=2) for a single cycle, then the sequence of values $f_{0,0}[x((n)T)], f_{0,1}[x((n+1)T)], f_{0,2}[x((n+1)T)], f_{0,3}[x((n+2)T)], f_{0,4}[x((n+3)T)], \ldots, f_{N-1,0}[x((n)T)], f_{N-1,1}[X((n+1)T)], f_{N-1,2}[x((n+1)T)], f_{N-1,3}[x((n+2)T)], f_{N-1,4}[x((n+3)T)]$ are generated as a function of time during a chaotic sequence generation.

It should also be appreciated that a chaotic sequence generation process using polynomial equations $f_0[x((n+v)T+t)], \ldots, f_{N-1}[x((n+v)T+t)]$ can be accelerated or decelerated by an arbitrary number of cycles. For example, if one RNS component of a chaotic sequence generation process is to be accelerated by one million (1,000,000) cycles at time two (n=2) for a single cycle and $m_i$ equals five-hundred eleven (511), then the sequence of values $f_{mi,0}[x(nT)], f_{mi,1}[x((n+1)T)], f_{mi,2}[x((n+1,000,002)T)], f_{mi,3}[x((n+1,000,003)T)], f_{mi,4}[x((n+1,000,004)T)]$ are generated as a function of time during a chaotic sequence generation. Using the fact that 1,000,000=1956·511+484 or 1,000,000 mod 511=484, the sequence of values can be re-written as $f_{mi,0}[x(nT)], f_{mi,1}[x((n+1)T)], f_{mi,2}[x((n+484+2)T)], f_{mi,3}[x((n+484+3)T)], f_{mi,4}[x((n+484+4)T)]$ or equivalently as $f_{mi,0}[x(nT)], f_{mi,1}[x((n+1)T)], f_{mi,2}[x((n-27+2)T)], f_{mi,3}[x((n-27+3)T)], f_{mi,4}[x((n-27+4)T)]$. The invention is not limited in this regard.

Referring again to FIG. 12, the polynomial equations $f_0[x((n+v)T+t)], \ldots, f_{N-1}[x((n+v)T+t]$ can be selected as the same polynomial equation or distinct polynomial equations. The polynomial equations can be selected as irreducible polynomial equations having chaotic properties in Galois field arithmetic. Each of the polynomial equations $f_0[x((n+v)T+t)], \ldots f_{N-1}[x((n+v)T+t]$ can be solved independently to obtain a respective solution. Each solution can be expressed as a residue number system (RNS) residue value using RNS arithmetic operations, i.e. modulo operations. The RNS employed for solving each of the polynomial equations $f_0[x((n+v)T+t)], \ldots, f_{N-1}[x((n+v)T+t)]$ respectively has a selected modulus value $m_0, m_1, \ldots, m_{N-1}$. The value chosen for each RNS moduli is preferably selected to be relatively prime numbers $p_0, p_1, \ldots, p_{N-1}$. Consequently, each RNS arithmetic operation employed for expressing a solution as an RNS residue value uses a different relatively prime number $p_0, p_1, \ldots, p_{N-1}$ as a moduli $m_0, m_1, \ldots, m_{N-1}$. The RNS residue values are also referred to herein as "RNS solutions No. 1, . . . , No. N".

According to an embodiment of the invention, each of the polynomial equations $f_0[x((n+v)T+t)], \ldots, f_{N-1}[((n+v)T+t)]$ is selected as an irreducible cubic polynomial equation having chaotic properties in Galois field arithmetic. According to another embodiment of the invention, the polynomial equations $f_0[x((n+v)T+t)], \ldots, f_{N-1}[((n+v)T+t)]$ are identical exclusive of a constant value C. The invention is not limited in this regard.

Referring again to FIG. 12, it should be appreciated that each of the RNS solutions No. 1, . . . , No. N is expressed in a weighted number system representation. In a preferred embodiment of the invention, each of the RNS solutions No. 1, . . . , No. N is expressed in a binary number system representation. As such, each of the RNS solutions No. 1, . . . , No. N is a binary sequence of bits. Each bit of the sequence has a zero (0) value or a one (1) value. Each binary sequence has a bit length selected in accordance with particular moduli.

The RNS solutions No. 1, . . . , No. N are mapped to a weighted number system representation thereby forming an accelerated or decelerated chaotic sequence output Y. The RNS solutions can be mapped to the weighted number system using mixed-radix conversion based method or a Chinese remainder theorem (CRT) arithmetic operation. The accelerated or decelerated chaotic sequence output Y can be expressed in a binary number system representation.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (4) can be rewritten in a general iterative form: $f[x((n+v)T+t)]=Q(k)x^3[((n+v)-1)T+t]+R(k)x^2[((n+v)-1)T+t]+S(k)x[((n+v)-1)T+t]+C(k,L)$. For example, a fixed coefficient polynomial equation is selected as f[x((n+v)·1 ms+t)]=3x³[((n+v)−1)·1 ms+t]+3x²[((n+v)−1)·1 ms+t]+x[((n+v)−1)·1 ms+t]+8 modulo 503. n is a variable having a value defined by an iteration being performed. x is a variable having a value allowable in a residue ring. v is a variable having a value selected to accelerate or decelerate a chaotic sequence generation by at least one cycle. t is a variable representing time. In a first iteration, n equals one (1). v equals zero so that the chaotic sequence generation is not accelerated or decelerated by a predefined number of cycles. t equals zero. x is selected as two (2) which is allowable in a residue ring. By substituting the value of n, v, t, and x into the stated polynomial equation f[x((n+v)T+t)], a first solution having a value forty-six (46) is obtained. In a second iteration, n is incremented by one. x equals the value of the first solution, i.e., forty-six (46) resulting in the solution 298,410 mod 503 or one hundred thirty-one (131). In a third iteration, n is again incremented by one. x equals the value of the second solution.

It should be noted that the transmitters $102_1, \ldots, 102_N$ can be configured to generate the same chaotic sequence using a chaotic sequence generation method as described above in relation to FIG. 12. However, each of the transmitters $102_1, \ldots, 102_N$ can be provided with a different initial value for the variable "x" and/or a different value for the acc-dec variable "v". As such, the transmitters $102_1, \ldots, 102_N$ can generate that same chaotic sequence with different static offsets. The chaotic sequences generated at the transmitters $102_1, \ldots, 102_N$ provide statistically orthogonal chaotic spreading codes for spreading signals over a large common frequency band. The spread spectrum signals can be transmitted from the transmitters to the base station 104 (described above in relation to FIG. 1) or receivers $154_1, \ldots, 154_N$ (described above in relation to FIG. 2). At the receivers, the appropriate statistically orthogonal spreading codes are used to recover the original signals intended for a particular user. Accordingly, the receivers $154_1, \ldots, 154_N$ can be configured to generate replicas of the statistically orthogonal chaotic spreading codes using a chaotic sequence generation method as described above in relation to FIG. 12.

All of the apparatus, methods, and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for code-division multiplex communications, comprising the steps of:
generating a plurality of orthogonal or statistically orthogonal chaotic spreading codes having different static offsets using a set of modular polynomial equations of a third order or higher, where at least two polynomial equations of said set of modular polynomial equations differ with respect to polynomial degree;
forming a plurality of spread spectrum communications signals respectively using said plurality of orthogonal or statistically orthogonal chaotic spreading codes; and
concurrently transmitting said plurality of spread spectrum communications signals over a common RF frequency band;
wherein each spreading code of said plurality of orthogonal or statistically orthogonal chaotic spreading codes is generated using a different acc-dec value for a variable "v" of said modular polynomial equations, where v is a variable defined by a modular arithmetic equation and has a value selected to advance or regress a chaotic sequence generation by at least one cycle.

2. The method according to claim 1, wherein said generating step further comprises using residue number system (RNS) arithmetic operations to determine a plurality of solutions for said set of modular polynomial equations, said plurality of solutions iteratively computed and expressed as RNS residue values.

3. The method according to claim 2, wherein said generating step further comprises determining a series of digits in a weighted number system based on said RNS residue values.

4. The method according to claim 3, wherein said generating step further comprises selecting a value for each of N moduli in an RNS used for solving said set of modular polynomial equations.

5. The method according to claim 1, wherein said generating step further comprises selecting a plurality of relatively prime numbers to be used as moduli in solving said set of modular polynomial equations.

6. The method according to claim 1, further comprising:
receiving said plurality of spread spectrum communications signals at a receiver;
generating at least one chaotic de-spreading code; and
de-spreading at least one of said spread spectrum communications signals using said at least one chaotic de-spreading code.

7. The method according to claim 1, further comprising:
receiving said plurality of spread spectrum communications signals at a receiver;
generating a plurality of chaotic de-spreading codes; and
de-spreading said plurality of spread spectrum communications signals using said plurality of chaotic de-spreading codes.

8. The method according to claim 1, further comprising synchronizing a chaotic de-spreading code in time and frequency with at least one of said plurality of orthogonal chaotic spreading codes.

9. A code-division multiplex communication system, comprising:
a plurality of transmitters configured to
generate a plurality of orthogonal or statistically orthogonal chaotic spreading codes having different static offsets using a set of modular polynomial equations of a third order or higher, where at least two polynomial equations of said set of modular polynomial equations differ with respect to polynomial degree,
form a plurality of spread spectrum communications signals respectively using said plurality of orthogonal or statistically orthogonal chaotic spreading codes, and
concurrently transmit said plurality of spread spectrum communications signals over a common RE frequency band;
wherein each spreading code of said plurality of orthogonal or statistically orthogonal chaotic spreading codes is generated using a different acc-dec value for a variable "v" of said modular polynomial equations, where v is a variable defined by a modular arithmetic equations and has a value selected to advance or regress a chaotic sequence generation by at least one cycle.

10. The system according to claim 9, wherein said plurality of transmitters is further configured to use residue number system (RNS) arithmetic operations to determine a plurality of solutions for said set of modular polynomial equations, said plurality of solutions iteratively computed and expressed as RNS residue values.

11. The system according to claim 10, wherein said plurality of transmitters is further configured to determine a series of digits in a weighted number system based on said RNS residue values.

12. The system according to claim 11, wherein said plurality of transmitters is further configured to use a pre-selected value for each of N moduli in an RNS to solve said set of modular polynomial equations.

13. The system according to claim 9, wherein said plurality of transmitters is further configured to use a plurality of pre-selected relatively prime numbers as modulus to solve said set of modular polynomial equations.

14. The system according to claim 9, further comprising a receiver configured to
receive said plurality of spread spectrum communications signals,
generate at least one chaotic de-spreading code, and
de-spread at least one of said spread spectrum communications signals using said at least one chaotic de-spreading code.

15. The system according to claim 9, further comprising a receiver configured to
receive said plurality of spread spectrum communications signals,
generate a plurality of chaotic de-spreading codes, and
de-spread said plurality of spread spectrum communications signals using said plurality of chaotic de-spreading codes.

16. The system according to claim 9, further comprising a receiver configured to synchronize a chaotic de-spreading code in time and frequency with at least one of said plurality of orthogonal or statistically orthogonal chaotic spreading codes.

* * * * *